(12) United States Patent
Bao et al.

(10) Patent No.: US 11,859,810 B2
(45) Date of Patent: Jan. 2, 2024

(54) LIGHTING FIXTURE WITH ILLUMINATION ADJUSTING FUNCTION, ILLUMINATION ADJUSTING ASSEMBLY AND ILLUMINATION ARRANGEMENT

(71) Applicant: NINGBO TAKENOW TECHNOLOGY CO., LTD., Yuyao (CN)

(72) Inventors: Yong Bao, Yuyao (CN); Jiaozhen Xia, Yuyao (CN)

( * ) Notice: Subject to any disclaimer, the term of this patent is extended or adjusted under 35 U.S.C. 154(b) by 0 days.

(21) Appl. No.: 18/165,301

(22) Filed: Feb. 6, 2023

(65) Prior Publication Data
US 2023/0313975 A1  Oct. 5, 2023

(30) Foreign Application Priority Data

Apr. 1, 2022 (CN) .......................... 202220747025.8
Oct. 24, 2022 (CN) .......................... 202211300253.1
Oct. 24, 2022 (CN) .......................... 202211300268.8

(51) Int. Cl.
*F21V 9/40* (2018.01)
*F21V 5/04* (2006.01)
*G02F 1/137* (2006.01)
*F21L 4/00* (2006.01)
*F21V 7/06* (2006.01)

(52) U.S. Cl.
CPC ................ *F21V 9/40* (2018.02); *F21L 4/005* (2013.01); *F21V 5/04* (2013.01); *F21V 7/06* (2013.01); *G02F 1/13756* (2021.01); *G02F 2203/01* (2013.01)

(58) Field of Classification Search
CPC .............................. F21V 9/40; G02F 1/13756
See application file for complete search history.

(56) References Cited

U.S. PATENT DOCUMENTS

2019/0226656 A1*  7/2019  Toko ...................... G02F 1/1396

* cited by examiner

*Primary Examiner* — Robert J May
(74) *Attorney, Agent, or Firm* — Tsz Lung Yeung

(57) ABSTRACT

A lighting fixture includes a lighting body and an illumination adjusting element which is arranged on the lighting body and is capable of being switched between an opaque mode and a transparent mode by means of electrical control, so that the lighting fixture is able to provide different illumination patterns.

21 Claims, 16 Drawing Sheets

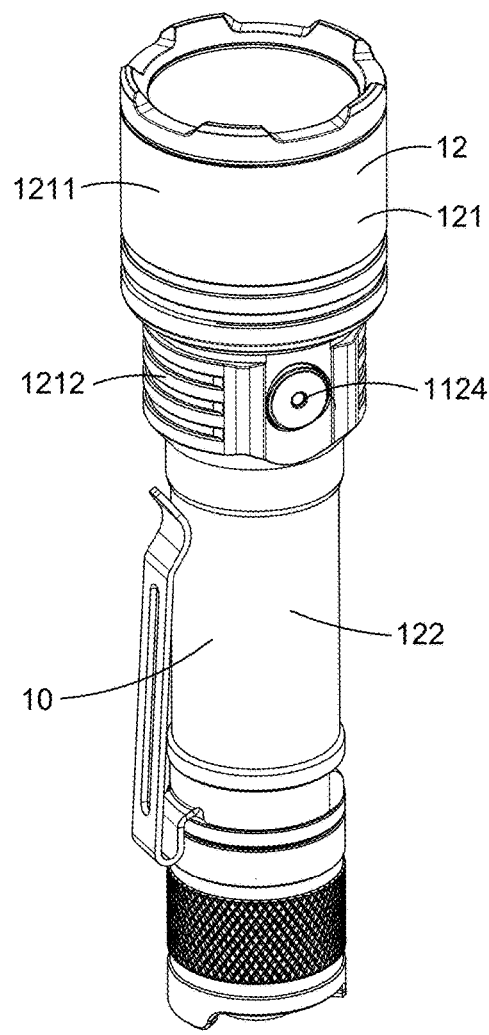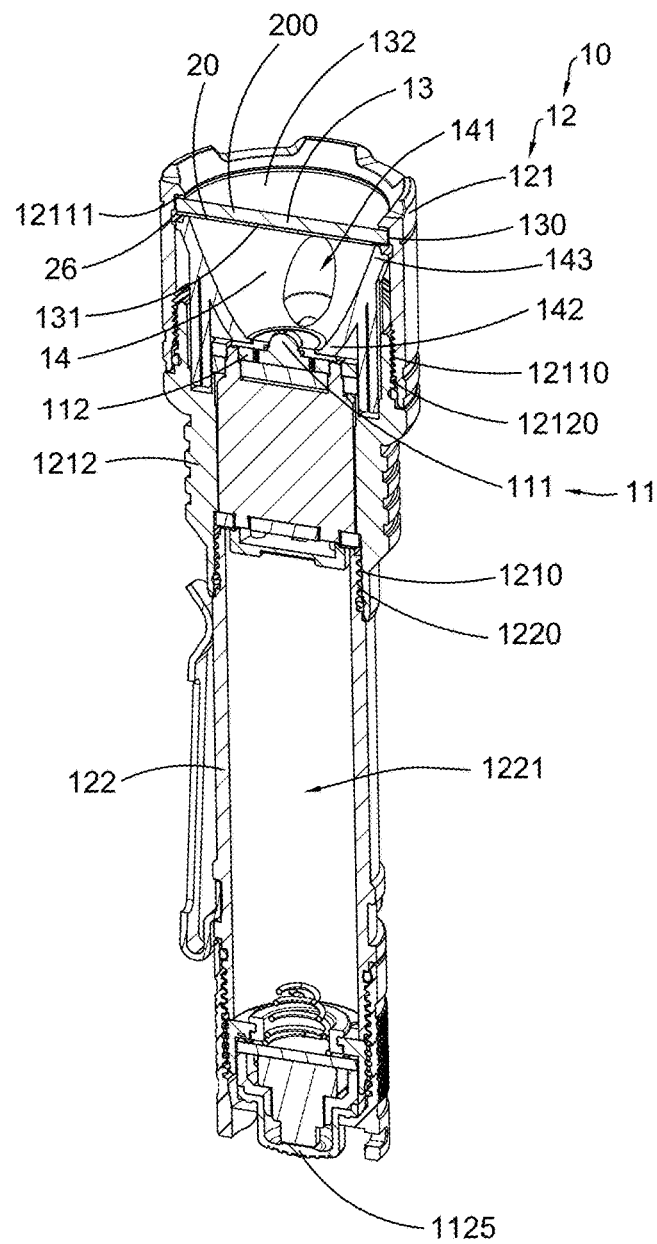
FIG.7
FIG.8

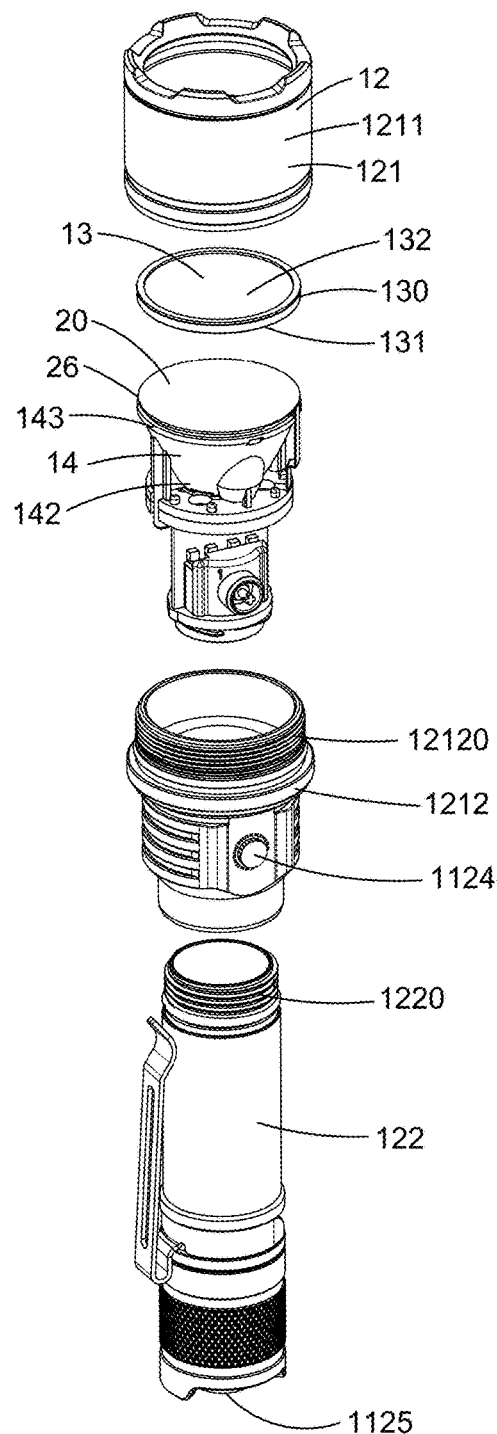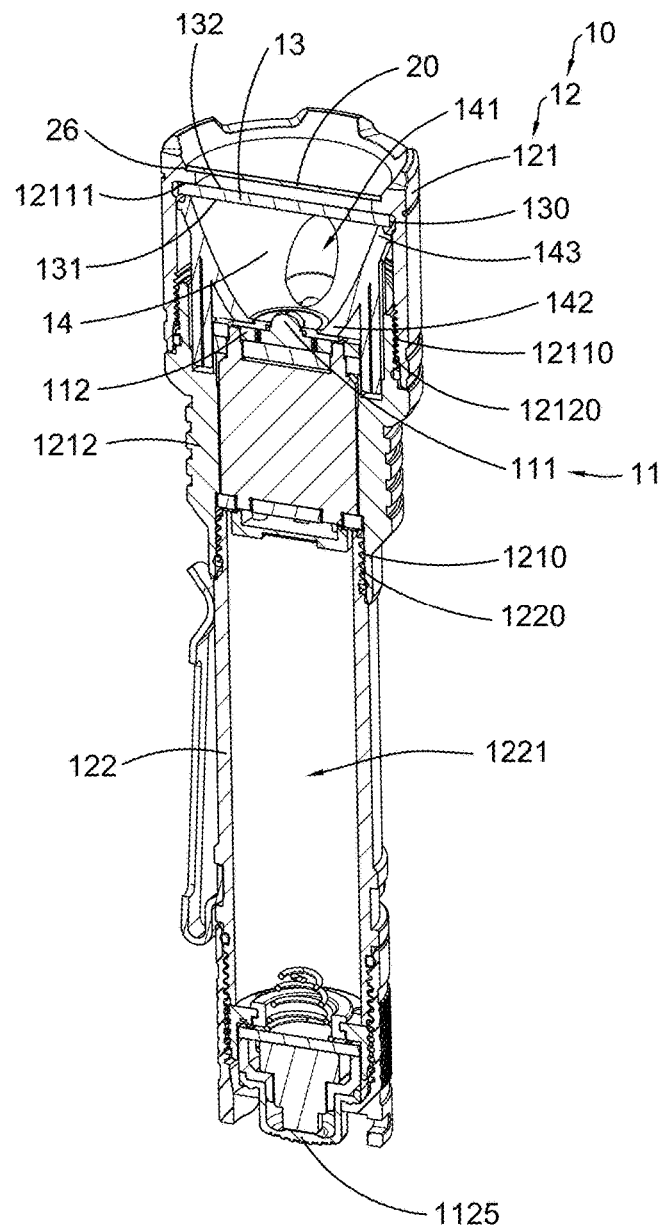
FIG.13
FIG.14

LIGHTING FIXTURE WITH ILLUMINATION ADJUSTING FUNCTION, ILLUMINATION ADJUSTING ASSEMBLY AND ILLUMINATION ARRANGEMENT

CROSS REFERENCE OF RELATED APPLICATION

This application is a non-provisional application that claims priority under 35 U.S.C. § 119 to China application number CN 202220747025.8, filing date Apr. 1, 2022, China application number CN202211300268.8, filing date Oct. 24, 2022, and China application number CN202211300253.1, filing date Oct. 24, 2022, wherein the entire content of which are expressly incorporated herein by reference.

BACKGROUND OF THE PRESENT INVENTION

Field of Invention

The present invention relates to a lighting device, and more particularly to a lighting fixture with an illumination adjusting element that is capable of controlling an illumination pattern of the lighting fixture.

Description of Related Arts

During the use of an ordinary lamp, the installation position and the illumination angle will have different requirements according to different application situations. When the illuminated object has different gloss levels, if the lamp cannot be adjusted according to the gloss of the illuminated object, it will result in insufficient reflected light when irradiating toward a low gloss surfaces or easily result in a reflective glare caused by irradiating toward a high gloss surface.

In order to allow the light to be converged or diffused, so as to provide different illumination intensities and different illumination patterns, US2012/0020059A1 has disclosed a flashlight which includes a casing, a light source, a lamp head and a front lens supported in the lamp head in which the light source is fixed on a support disk. In order to condense the light beam of the flashlight, the front lens is movably supported with respect to the light source, so as to adjust the distance between the front lens and the light source, so that the light emitted by the flashlight can be concentrated or diffused.

WO2006/119735A1 has disclosed an LED lighting module which includes an LED and a rotationally, integral, light-transparent auxiliary optic system having an inner converging lens part and an outer reflecting mirror part. The auxiliary optical system has an opening in the form of a blind hole arranged at a rear side thereof, the LED can be moved axially along the optical axis, so that owing to the displacement, a change in the cone of light from a cone of light having a cone angle 12° up to a cone angle 20° can be produced by this movement, so that the shape of the light cone can be adjusted by moving the light source to adjust the distance between the light source and the converging lens part.

It can be seen that, in conventional lamps, the switching between the condensing light pattern and the diffusing light pattern is generally realized by the relative movement between the light source and the condensing lens. However, this light pattern adjusting method through the mechanical structure is likely to cause wear and tear between the mechanical parts, which is easy to damage and may cause the entire lamp to be unusable. Moreover, these mechanical structures can only provide two different light patterns. More specifically, in order to provide a stable light pattern, after the relative movement between the light source and the condensing lens, the light source and the condensing lens need to be fixed at the condensing position or the diffusing position, so as to stably provide the two different light patterns, and thus the light patterns provided by the lamps are limited and cannot be adjusted steplessly.

SUMMARY OF THE PRESENT INVENTION

The invention is advantageous in that it provides a lighting fixture with an illumination adjusting function, wherein switching between different illumination patterns is achieved through the electrical control of an illumination adjusting element, so that the operation is easy and a complex mechanical and fragile structure is not required.

Another advantage of the present invention is to provide a lighting fixture with an illumination adjusting function, wherein when the surface of the illuminated target is a low gloss surface, the illumination adjusting element can be in a transparent mode to allow more reflected light to reach human eyes, when the surface of the illuminated object is a high gloss surface, the illumination adjusting element can be in a diffusely scattering mode to allow less reflected light to reach the human eyes, so as to meet requirements of the different illumination conditions of the illuminated object surfaces with different glossiness.

Another advantage of the present invention is to provide a lighting fixture with an illumination adjusting function, wherein by controlling the current of the illumination adjusting element, continuous adjustment of the lighting effect can be realized, so as to meet the lighting requirements in different application conditions.

Another advantage of the present invention is to provide a lighting fixture with an illumination adjusting function, wherein the illumination adjusting element can be arranged on a lighting element, a lampshade or a condensing lens of the lighting fixture, so as to incorporate the illumination adjusting element without greatly changing the original structure of the lighting fixture, so that the manufacturing is easy.

Another advantage of the present invention is to provide a lighting fixture with an illumination adjusting function, wherein a control circuit of the illumination adjusting element can be integrated on an illumination driving circuit of the lighting fixture, so as to conveniently and cooperatively control the light illumination of the lighting element and the switching of the state of the illumination adjusting element.

Another advantage of the present invention is to provide a lighting fixture with an illumination adjusting function, wherein because the components do not need to be moved, the user can operate a control switch of the illumination adjusting element without a relatively force, thereby it is convenient to adjust the illumination light patterns of the lighting fixture.

Another advantage of the present invention is to provide an illumination adjusting assembly and an illumination arrangement, wherein the illumination adjusting assembly can be installed on a lighting fixture, so that the lighting fixture can be incorporated with the illumination adjusting assembly without changing the original structure and the illumination arrangement comprising the lighting fixture and illumination adjusting assembly is able to provide adjustable lighting effects.

Another advantage of the present invention is to provide an illumination adjusting assembly and an illumination arrangement, wherein the illumination adjusting assembly comprises an illumination adjusting element, so as to realize switching between different illumination patterns through the electrical control of the illumination adjusting element, so that it is easy to operate and does not require complex mechanical and fragile structures.

Another advantage of the present invention is to provide an illumination adjusting assembly and an illumination arrangement, wherein when the surface of the illuminated target is a low gloss surface, the illumination adjusting element can be in a transparent mode to allow more reflected light to reach human eyes, when the surface of the illuminated object is a high gloss surface, the illumination adjusting element can be in a diffusely scattering mode to allow less reflected light to reach the human eyes, so as to meet requirements of the different illumination conditions of the illuminated object surfaces with different glossiness.

Another advantage of the present invention is to provide an illumination adjusting assembly and an illuminating arrangement, wherein by controlling the current of the illumination adjusting element, continuous adjustment of the lighting effect can be realized, so as to meet the lighting requirements in different application conditions.

Another advantage of the present invention is to provide an illumination adjusting assembly and an illumination arrangement, wherein because there is no displacement of the components, the user can simply operate a control switch of the illumination adjusting element without a relatively force to achieve the illumination adjusting function, thereby it is convenient to adjust the illumination light patterns of the lighting fixture.

Another advantage of the present invention is to provide an illumination adjusting assembly and an illumination arrangement, wherein by incorporating the control of the illumination adjusting element with the illumination of the lighting fixture, the illumination adjusting assembly can be switched between a transparent state and a diffusely scattering state, so as to cope with the surfaces of the illuminated object with different gloss levels, so that it provides a more flexible solution for the actual use of the lighting fixture in scene lighting, lighting for inspection, lighting for maintenance and repairing, temporary lighting, etc.

Another advantage of the present invention is to provide a illumination adjusting assembly and an illuminating device, wherein the illumination adjusting assembly is configured with and independent driving circuit and an independent power supply, so that it can be easily function as an add-on structure on the lighting fixture to form the illumination arrangement that is capable of adjusting the lighting effects.

Additional advantages and features of the invention will become apparent from the description which follows, and may be realized by means of the instrumentalities and combinations particularly pointing out in the appended claims.

According to an aspect of the present invention, the present invention provides a lighting fixture comprising a lighting body and an illumination adjusting element which is arranged on the lighting body and is capable of being switched between an opaque mode and a transparent mode by means of electrical control, so that the lighting fixture is able to provide different illumination patterns.

In some embodiments, the lighting body comprises a light source, a housing and a condensing lens, wherein the light source and the condensing lens are assembled in the housing, and the condensing lens condenses the light emitted by the light source.

In some embodiments, the lighting body further comprises a reflector assembled to the light source for reflecting at least a part of the light generated by the light source toward the condensing lens.

In some embodiments, the light source comprises at least one light emitting member and a controller, the light emitting member is electrically connected to the controller, and a mounting end of the reflector is assembled to the controller, so that the light emitting member is located in a reflecting cavity of the reflector, an inner surface of the light emitting member defines the reflecting cavity and also form a a reflecting surface for reflecting the light from the light emitting member.

In some embodiments, the illumination adjusting element is attached to the inner side or the outer side of the condensing lens.

In some embodiments, the housing of the lighting body comprises a lamp housing, and the illumination adjusting element is disposed on the lamp housing.

In some embodiments, the illumination adjusting element is attached to the light emitting member.

In some embodiments, the controller comprises a circuit board and a connection circuit, the illumination adjusting element is electrically connected to the circuit board through the connection circuit, and the connection circuit is located at an outside of the reflector.

In some embodiments, the controller comprises a control switch that is electrically connected to the circuit board and used to control the power-on and power-off states of the illumination adjusting element.

In some embodiments, the control switch is a key.

In some embodiments, the control switch is a knob, which controls the transparency of the illumination adjusting element by adjusting a voltage supplied to the illumination adjusting element and adjusting an electric current flowing to the illumination adjusting element.

In some embodiments, local areas of the illumination adjusting element are switchable between the haze opaque mode and the transparent mode.

In some embodiments, the illumination adjusting element comprises two tin-doped indium oxide films and a liquid crystal layer between the two tin-doped indium oxide films.

In some embodiments, the illumination adjusting element comprises two layers of tin-doped indium oxide films and a liquid crystal layer located in a partial middle region of the two layers of tin-doped indium oxide films, so that the middle region of the illumination adjusting element can be switched between the haze opaque mode and the transparent mode, the annular area around the middle area of the illumination adjusting element is transparent.

In some embodiments, the housing comprises a lamp housing and a power supply housing, the lamp housing is used for assembling the light source, the condensing lens and the reflector, and the power supply housing is used for assembling a power module.

In some embodiments, the lamp housing comprises a lamp housing and a accommodating housing, the condensing lens is assembled to the lamp housing, the inner side of the lamp housing has a stepped surface, and the condensing lens has an outer periphery that abuts against the stepped surface at the inner side of the lamp housing, so that the condensing lens is assembled to the lamp housing.

In some embodiments, a peripheral edge of the illumination adjusting element is sandwiched between a peripheral edge of the condensing lens and an outlet end of the reflector, so that the illumination adjusting element can be firmly fixed to the condensing lens between the condensing lens and the outlet end of the reflector.

According to another aspect of the present invention, the present invention provides an illumination adjusting assembly which is suitable for being mounted on a lighting fixture to form an illumination arrangement, wherein the illumination adjusting assembly comprises an illumination adjusting element, a mounting element adapted to be mounted on the lighting fixture, a driving module which is electrically connected to the illumination adjusting element, and a control switch which is electrically connected to the driving module, wherein the control switch is operated to switch the illumination adjusting element between a opaque mode and a transparent mode so that the illumination arrangement can provide different illumination patterns.

According to some embodiments, the mounting element of the illumination adjusting assembly is mounted on an outer side of the lighting fixture by a detachable connecting structure.

According to some embodiments, the illumination adjusting assembly is detachably mounted on the lighting fixture through a threaded structure, an elastic mounting ring or a magnetic attracting member.

According to some embodiments, the illumination adjusting assembly is adapted to be mounted inside a housing of the lighting fixture.

According to some embodiments, the illumination adjusting element comprises two tin-doped indium oxide films and a liquid crystal layer between the two tin-doped indium oxide films.

According to some embodiments, the illumination adjusting element comprises two tin-doped indium oxide films and a liquid crystal layer in partial area between the two tin-doped indium oxide films.

According to some embodiments, the liquid crystal layer is located in the middle area of illumination adjusting element, so that the middle area of the illumination adjusting element can be switched between the opaque mode and the transparent mode. The annular area around the middle area is transparent.

According to some embodiments, the illumination adjusting assembly further comprises a power supply module for providing power supply to the driving module and the illumination adjusting element.

According to some embodiments, the dimming switch is a button or a knob, and the knob is used to adjust the voltage of the current flowing through the illumination adjusting element to control the transparency of the illumination adjusting element.

According to another aspect of the present invention, the present invention provides an illumination arrangement comprising a lighting fixture and an illumination adjusting assembly, wherein the lighting fixture comprises a light source, a housing and a controller, wherein the light source is electrically connected to the controller and assembled to the housing, and the light source comprises a light emitting member, wherein the illumination adjusting assembly comprises an illumination adjusting element, a mounting element adapted to be mounted on the lighting fixture, a driving module which is electrically connected to the illumination adjusting element, and a control switch which is electrically connected to the driving module, wherein the control switch is operated to switch the illumination adjusting element between a opaque mode and a transparent mode so that the illumination arrangement can provide different illumination patterns.

According to some embodiments, the lighting fixture comprise the housing, and the illumination adjusting assembly is detachably mounted on the housing of the light fixture through a threaded structure, an elastic mounting ring or a magnetic attracting member, so as to be secured on the lighting fixture.

According to some embodiments, the illumination adjusting assembly is provided around the light emitting element.

According to some embodiments, the lighting fixture further comprises a reflector for reflecting light from the light emitting member, wherein the illumination adjusting assembly is disposed at an outer side of the reflector, so that the light reflected by the reflector reach the illumination adjusting element, so as to be adjusted.

According to some embodiments, the lighting fixture further comprises a condensing lens, the housing comprises a lamp housing, the condensing lens is mounted on an outlet end of the reflector, wherein the illumination adjusting assembly is disposed around the reflector and the condensing lens, so that the light reflected by the reflector and the light refracted by the condensing lens reach the illumination adjusting element, so as to be adjusted.

According to some embodiments, the lighting fixture further comprises a condensing lens and a lamp housing, the condensing lens is mounted to the lamp housing, wherein the illumination adjusting assembly is adapted to be disposed between the reflector and the condensing lens, so that the light emitted by the light emitting member first reaches the reflector and the illumination adjusting element, and then passes through the condensing lens to exit the lighting fixture.

According to another aspect of the present invention, the present invention further provides for a solution for solving the deficiencies in the prior art. The purpose of the present invention is to provide a lighting fixture with illumination adjusting and controlling function. By the control of the illumination adjusting element, a light diffusion structure can be realized. The effect of instantaneous switching between the opaque state and the transparent state is able to cope with the lighting conditions on the surface of the illuminated object with different gloss levels, so as to provide a more flexible solution for the actual use of the lighting body in scene lighting, inspection lighting, maintenance lighting, temporary lighting, etc.

In order to achieve the above object, the present invention is achieved by the following technical solution via a lighting fixture with a control function of an illumination adjusting element, wherein the lighting fixture comprises a lighting body, a lampshade or a lens of the lighting body is provided with the illumination adjusting element, and connecting ends of the illumination adjusting element are connected with the built-in lamp driver of the lighting body, the light emitting end of the lighting body is provided with a light emitting member, the back of the lighting body is provided with an interface for the connection circuit of the lamp driver, and the outer shell of the lighting body is provided with a control switch for control the operation of the illumination adjusting element.

Preferably, the illumination adjusting element can be arranged on a movable lighting body, a fixed lighting body, a lighting body with a built-in lamp driver, a lamp holder, a magnet, or a handle for temporary or fixed installation of the lighting body Preferably, the illumination adjusting element comprises two ITO films and a liquid crystal layer, wherein both sides of the liquid crystal layer are provided with ITO films, light is incident at one side of one ITO film and projects out through another side of the other ITO film, the ITO films are electrically connected to driver circuit of the lighting body.

The present invention is advantageous in that its structure design is simple and reasonable, the diffuser plate or lamp housing is introduced with the illumination adjusting element 2, so that the effect of instantaneous switching between the opaque state and transparent state of the diffuser plate or the lam housing can be realized to cope with the illumination conditions on the surfaces of the illuminated objects with different gloss levels. For instance, for meeting with requirements of the architectural lighting design standard GB 50034-2013, the present inventions provides technical options for reducing light curtain reflection and reflected glare, and provides more flexible solutions for the actual use of the lighting fixture in scene lighting, lighting for inspection, lighting for maintenance and repairing, temporary lighting, etc.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 7 is a perspective view of a flash light according to a second preferred embodiment of the present invention.

FIG. 8 is a sectional view of the flash light according to the above second preferred embodiment of the present invention.

FIG. 13 is an exploded view of the flash light according to a second alternative mode of the above second preferred embodiment of the present invention.

FIG. 14 is a sectional view of the flash light according to a third alternative mode of the above second preferred embodiment of the present invention.

DETAILED DESCRIPTION OF THE PREFERRED EMBODIMENT

Figure 1A:
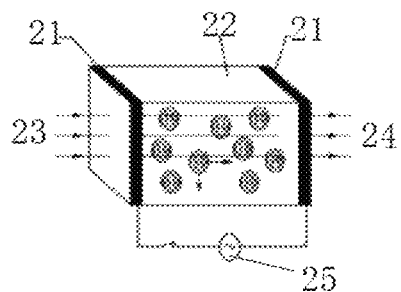
FIGS. 1A, 1B, 1C and 1D are schematic views illustrating the working principle of an illumination adjusting element of the present invention.
Figure 1C:
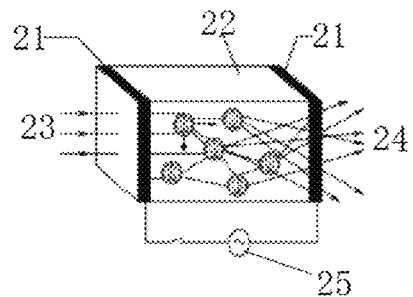
Figure 1B:
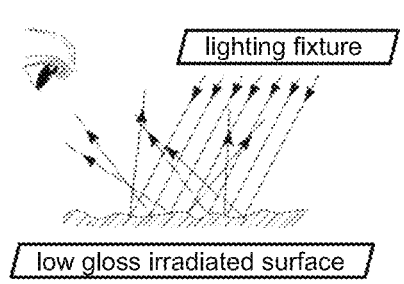
Figure 1D:
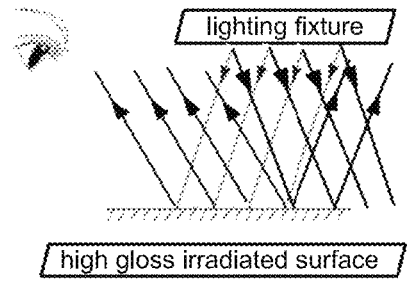
Figure 2:
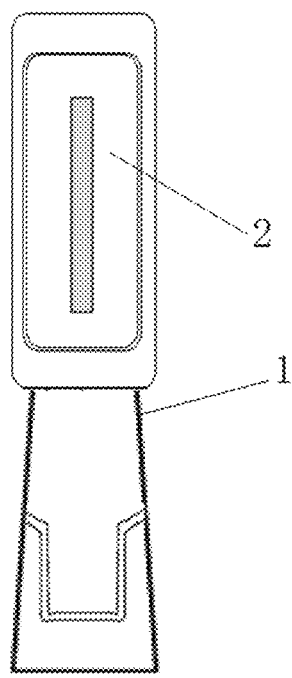
FIG. 2 is a schematic view illustrating a hand-held work light with an illumination adjusting element provided on a lens according to a first example of a first preferred embodiment of the present invention.
Figure 3:
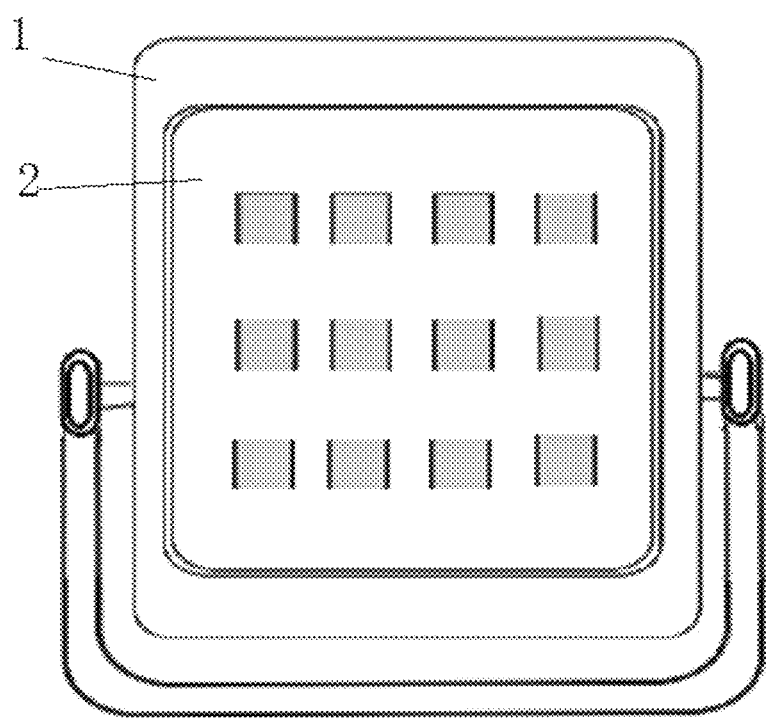
FIG. 3 is a schematic view illustrating a work light with a stand frame and with an illumination adjusting element provided on a lens according to a second example of the above first preferred embodiment of the present invention.
Figure 4:
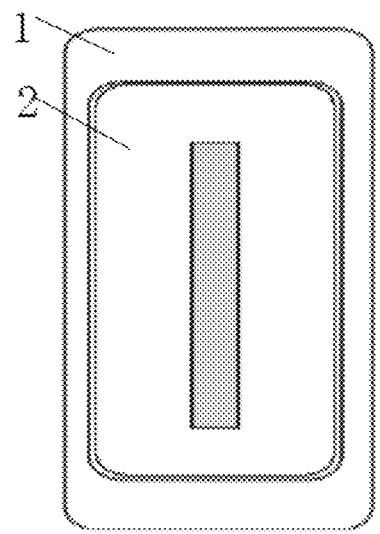
FIG. 4 is a schematic view illustrating a pock-sized hand-held work light with an illumination adjusting element provided on a lens according to a third example of the above first preferred embodiment of the present invention.
Figure 5:
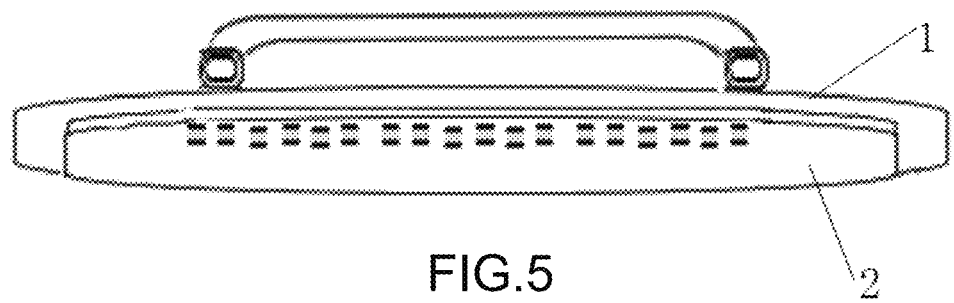
FIG. 5 is a schematic view illustrating an elongated type work light with a stand frame and with an illumination adjusting element provided on a lens according to a fourth example of the above first preferred embodiment of the present invention.
Figure 6:
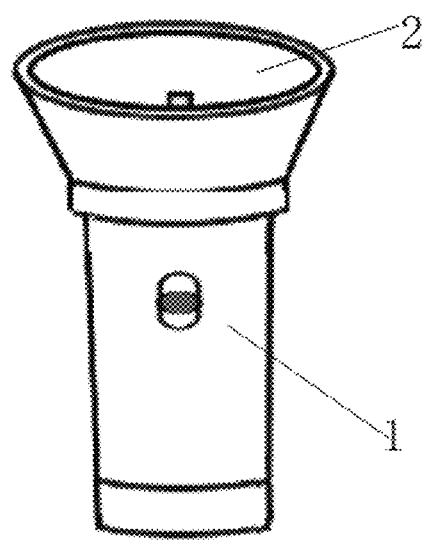
FIG. 6 is a schematic view illustrating a flash light with with an illumination adjusting element provided on a lens according to a fourth example of the above first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above mentioned terminologies shall not be interpreted as confine to the present invention.

Referring to FIG. 1A to FIG. 6 of the drawings, according to a first preferred embodiment of the present invention, the specific implementation of the present invention adopts a following technical solution of a lighting fixture with an illumination adjusting and controlling function, the lighting fixture comprises a lighting body 1, and an illumination adjusting element 2 which is provided on a lamp housing or a lens of the lighting body 1, connecting ends of the illumination adjusting element 2 are connected with a lamp driver in the lighting body 1, a light output end of the lighting body 1 is provided with a lighting element and a back of the lighting body 1 is provided with an interface for the electrical connection circuit of the lamp driver, the lamp housing of the lighting body 1 is provided with a switch to control the operation of the illumination adjusting element 2.

It is worth mentioning that the illumination adjusting element 2 can be arranged on a movable lighting body or a fixed lighting body, a lighting body with a built-in lamp driver, a lamp frame, a magnet or a handle for a temporary or fixed installation of the lighting body.

In addition, the illumination adjusting element 2 comprises a liquid crystal layer 22, and two ITO films 21 on both sides of the liquid crystal layer 22, an incident light 23 is incident at one side of one ITO film 21, a transmission light 24 is projecting through one side of the other ITO film 21, the two ITO films 21 are connected to a lamp driving power source 25 in the lighting body 1.

A lens is provided between the lighting element of the lighting body 1 and the illumination adjusting element 2, and the illumination adjusting element 2 is attached on the lens.

In this specific embodiment, the opaque or transparent state of the illumination adjusting element 2 is employed to control and adjust the illumination of the lighting fixture by electrically energizing or not energizing the illumination adjusting element 2, so as to realize the adjustment of beam angles between a condensing pattern to a diffusely scattering pattern through an electrical signal control.

In this specific embodiment, a lamp diffuser plate or a lamp housing with the illumination adjustment and control function by incorporating with the illumination adjusting element 2 provides the lighting body 1 with a flexible and controllable solution for dealing with illumination situations with high or low gloss irradiated surfaces. Applicable lighting bodies include movable lamp bodies and fixed lamp bodies, lamp bodies with built-in lamp drivers, and lamp frames, magnets or handles for temporary or fixed installation of the lamp bodies. As an example, the illumination adjusting element 2 can be proved on the surface of the lamp housing, and the connecting ends of the illumination adjusting element 2 are connected with a lamp driver built in the lighting body, and the outer shell of the lighting body is provided with a switch for controlling the operation of the illumination adjusting element 2. Accordingly, the diffuser plate or lamp housing is introduced with the illumination adjusting element 2, so that the effect of instantaneous switching between the opaque state and transparent state of the diffuser plate or the lam housing can be realized to cope with the illumination conditions on the surfaces of the illuminated objects with different gloss levels. For instance, for meeting with requirements of the architectural lighting design standard GB 50034-2013, the present inventions provides technical options for reducing light curtain reflection and reflected glare, and provides more flexible solutions for the actual use of the lighting fixture in scene lighting, lighting for inspection, lighting for maintenance and repairing, temporary lighting, etc.

In a specific application, if the lighting fixture is fixedly installed, in order to follow the requirements of some architectural lighting design standards such as GB 50034-2013, when designing with DIALUX or similar optical design software for the selected scene, after the required scene parameters are selected, it is possible to compare the design results of the opaque mode IES file and the transparent mode IES file of the lighting fixture, so as to meet the glare limit of the architectural lighting design standards such as GB 50034-2013, and based on the requirements of meeting the glare limit and under the requirements of light distribution, as well as choosing lamps with high efficiency or high efficacy, select the opaque mode or transparent mode of the lighting fixture when the lighting fixture needs to be set in the final fixed installation and construction.

In another specific application, the lighting fixture is a movable lamp. During the design of the lighting fixture, the illumination distance, light output intensity and light distribution curve required by the lighting fixture need to be reasonably designed. In the case of differences in surface gloss, in order to meet the requirement of some architectural lighting design standards such as GB 50034-2013, algorithm of unified glare value UGR and glare GR, or use DIALUX or similar optical design software to design the lighting fixture, so as to meet the requirements such as the glare limit. At the same time, the opaque mode IES file and the transparent mode IES file of the lighting fixture can be used to give guidance for the selection of the illumination mode of the movable lighting fixture for illuminating the surfaces of different illuminated objects.

As shown in FIGS. 7 to 11, a lighting fixture with an illumination adjusting and control function according to a second preferred embodiment of the present invention is illustrated. The lighting fixture is implemented as a flashlight or a torch comprising a lighting body 10 and an illumination adjusting element 20 provided on the lighting body for being switched between an opaque mode and a transparent mode by means of electrical control, so that the lighting fixture can provide different illumination patterns.

More specifically, the lighting body 10 comprises a light source 11, a housing 12 and a condensing lens 13, wherein the light source 11 and the condensing lens 13 are assembled in the housing 12, and the light source 11 emits light which is condensed by the condensing lens 13, so as to project out for providing lighting effects. In this embodiment, the lighting body 10 further comprises a reflector 14, which is bowl-shaped and has a tapered cross-section, the reflector 14 has a light reflecting cavity 141, and has a mounting end 142 and an outlet end 143. The mounting end 142 of the reflector 14 is assembled with the light source 11, and the condensing lens 13 is assembled on the outlet end 143 of the reflector 14, so that a part of the light generated by the light source 11 projects to the condensing lens 13 and then is condensed, and another part of the light reaches the reflector 14 and then is reflected by the reflector 14 and then projects to the condensing lens 13 to be condensed, and finally emits out of the lighting fixture.

The light source 11 comprises at least one light emitting member 111 and a controller 112, and the light emitting member 111 is electrically connected to the controller 112. The mounting end 142 of the reflector 14 is assembled to the controller 112, so that the light emitting member 111 of the light source 11 is located in the reflector cavity 141, and an inner surface 144 of the reflector 14 defines the reflective cavity 141, and forms a reflective surface to reflect the light from the light emitting member 111. The condensing lens 13 may be a lens such as a convex lens capable of converging the light emitted by the light emitting member 111. In a specific example, the condensing lens 13 may be a Fresnel lens. The light emitting member 111 can be implemented as various light emitting components such as fluorescent lighting member, LED, OLED, and the like.

The housing 12 comprises a lamp housing 121 and a power supply housing 122, and the lamp housing 121 is used for assembling the light source 11 the condensing lens 13 and the reflector 14. The power supply housing 122 is used to assemble the power module. Correspondingly, the power supply housing 122 has a power supply cavity 1221 for accommodating a power supply module. The power supply module can be a rechargeable battery or an AC-DC conversion module to convert the AC power into a power supply that can be used by the lighting fixture.

Figure 9:
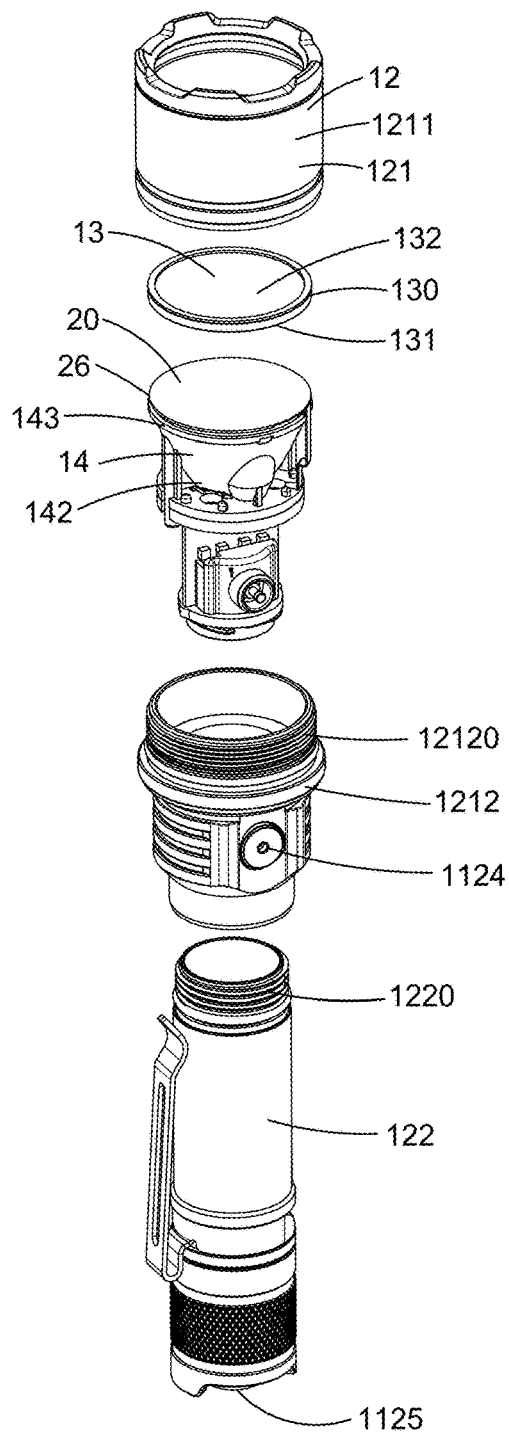
FIG. 9 is an exploded view of the flash light according to the above second preferred embodiment of the present invention.
Figure 10:
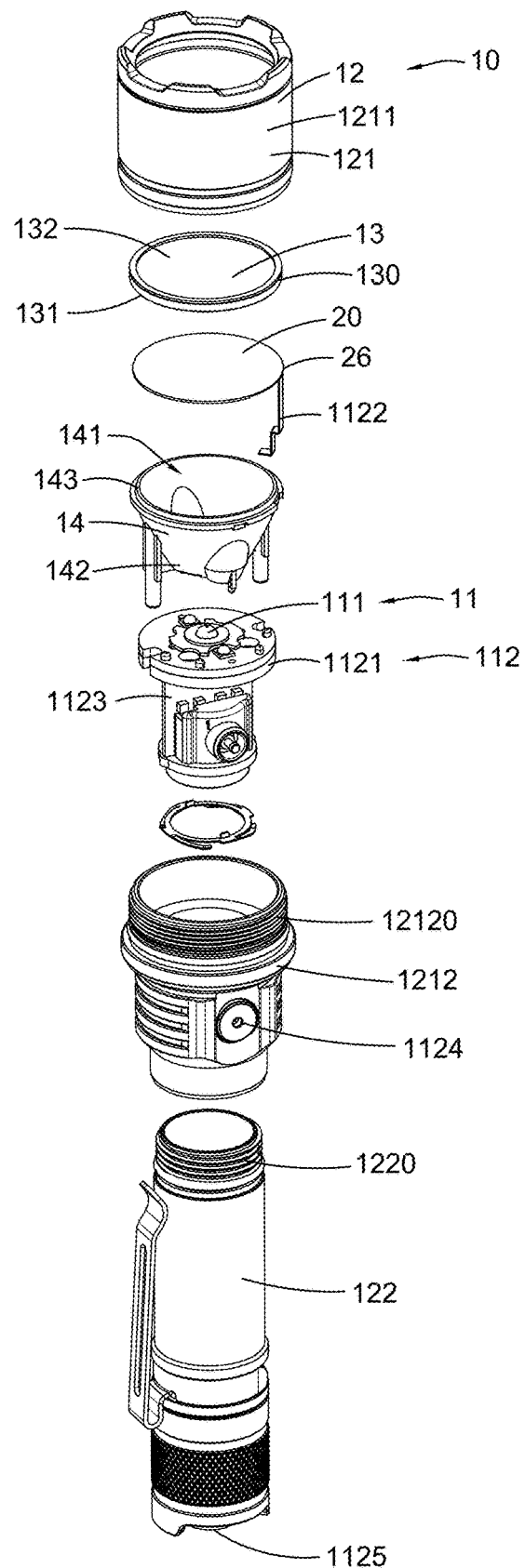
FIG. 10 is a further exploded view of the flash light according to the above second preferred embodiment of the present invention.
Figure 11:
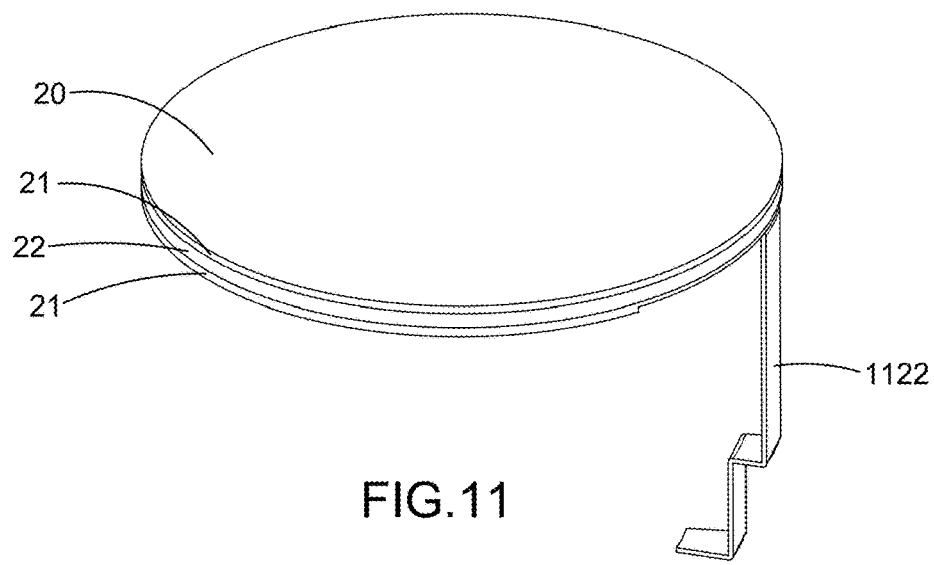
FIG. 11 is a partially enlarged view illustrating an illumination adjusting element of the flash light according to the above second preferred embodiment of the present invention.

The housing 12 can be an integral housing, or as shown in FIG. 9 and FIG. 10, the lamp housing 121 and the power supply housing 122 are separate housings, and can be assembled together. For example, the lamp housing 121 and the power supply housing 122 may be assembled through by inner threads 1210 and outer threads 1220 which are matched with each other.

In other words, the lighting fixture of the present invention may comprise two units, a light emitting unit and a power supply unit. The light-emitting unit comprises the lamp housing 121, the light source 11, the condensing lens 13 assembled in the lamp housing 121, and the reflector 14, the power supply unit comprises the power supply housing 122 and a rechargeable battery assembled in the power supply cavity 1221 of the power supply housing 122. The two units can be assembled independently and then assembled with each other. In this way, one light emitting unit can be paired with different power supply units, and one power supply unit can also be paired with different light emitting units, so that the assembly of the lighting fixture is relatively convenient.

In this embodiment of the present invention, the lighting fixture further comprises the illumination adjusting element 20 disposed on the condensing lens 13. As shown in the figures, the condensing lens 13 is a lens with an inner side 131 and an outer side 132, the inner side 131 refers to the side adjacent to the light emitting member 111 and facing the light emitting member 111, and the outer side 132 refers to the side opposite to the inner side 131 and away from the light emitting member 111. The illumination adjusting element in this embodiment is disposed on the inner side 131 of the condensing lens 13 and faces the light emitting member 111.

Correspondingly, the condensing lens 13 and the illumination adjusting element form a illumination adjusting mechanism 200 in this embodiment of the present invention, and they can cooperate with each other to gather or diffuse the light emitted by the light emitting member 111. More specifically, the condensing lens 13 plays the role of concentrating light, and the illumination adjusting element 20 is a component that can be electrically controlled to be switched between the power-on state and the power-off state, so as to be work in a transparent mode or an opaque mode. When the illumination adjusting element 20 is in the transparent mode, the light emitted by the light emitting member 111 passes through the transparent illumination adjusting element 20 and reaches to the condensing lens 13, so that the lighting fixture is in a spotlight mode to provide a concentrated illumination spot. When the illumination adjusting element 20 is in the opaque mode, the light emitted by the light emitting member 111 will be scattered after passing through the haze and opaque illumination adjusting element 20, and then be condensed by the condensing lens 13, so that the lighting fixture is in a diffusely scattering mode to provide diffused illumination light.

Correspondingly, the lighting fixture of the present invention can provide different lighting effects according to the needs of application scenarios. For example, when the irradiated target surface is a low gloss surface, the illumination adjusting element 20 can be electrically energized to be in a transparent mode so that the light emitted by the light emitting member 111 is condensed by the condensing lens 13, so as to allow more reflection light reflected by the irradiated target surface to reach the human eye. When the irradiated target surface is a high gloss surface, the illumination adjusting element 20 can be powered off to be in a haze and opaque mode, so that the light emitted by the light emitting member 111 is scattered by the light-adjusting film 20 before being condensed by the condensing lens 13, so that only a small amount of reflected light can reach the human eye, so that the lighting fixture can cope with the lighting conditions of the surface of the illuminated object with different gloss levels.

The illumination adjusting element 20, or illumination adjusting glass/film, comprises two transparent layers of ITO (Indium Tinoxide, tin-doped indium oxide) film 21 and a liquid crystal layer 22 located between the two layers of ITO films. When a voltage is applied to the two layers of the ITO films 21, that is, when the illumination adjusting element 20 is in an electrified state, the polymer liquid crystal materials of the liquid crystal layer 22 are arranged in an orderly manner, so that the liquid crystal layer 22 is in a transparent state, which allows light from the light emitting member 111 to emit to penetrate through the illumination adjusting element 20 without changing the projection direction. When the two layers of ITO films 21 are in a power-off state, the polymer liquid crystal materials of the liquid crystal layer 22 are arranged disorderly, so that the liquid crystal layer 22 is no longer transparent, so that the light emitted by the light emitting member 111 entering the illumination adjusting element 20 is diffusely scattered.

The lamp housing 121 further comprises a lamp cover 1211 and an accommodating housing 1212 which are detachably connected with each other, for example, they are detachably coupled with each other through inner threads 12110 and outer threads 12120. In this embodiment, the condensing lens 13 is assembled to the lamp cover 1211 which is in a shape of a lens barrel. More specifically, the inner side of the lamp cover 1211 has a stepped surface 12111, and the condensing lens 13 has an outer peripheral edge 130 biasing against the stepped surface 12111 inside the lamp cover 1211, so that the condensing lens 13 is assembled to the lamp cover 1211. It can be understood that an adhesive layer may be applied between the condensing lens 13 and the stepped surface 12111 inside the lamp cover 1211 to bond the condensing lens 13 to the stepped surface 12111 of the lamp cover 1211.

A peripheral edge 26 of the illumination adjusting element 20 is sandwiched between the periphery of the condensing lens 13 and the outlet end 143 of the reflector 14, so that the illumination adjusting element 20 can be stably fixed between the condensing lens 13 and the outlet end 143 of the reflector 14. It can be understood that an adhesive layer may also be applied between the periphery 26 of the illumination adjusting element and the condensing lens 13, and an adhesive layer can be applied between the periphery 26 of the illumination adjusting element 20 and the outlet end 143 of the reflector so as to connect the illumination adjusting element 20 to the condensing lens 13 and the reflector 14.

The controller 112 comprises a circuit board 1121, a connection circuit 1122, a switch circuit 1123 and a control switch 1124, and the light emitting member 111 is electrically connected to the circuit board 1121 and supported on the circuit board 1121. The illumination adjusting element 20 is electrically connected to the circuit board 1121 through the connection circuit 1122, the control switch 1124 is electrically connected to the circuit board 1121 through the switch circuit 1123, and the circuit board 1121 is supplied with electrical power by the rechargeable battery in the power supply cavity 1221 of the power supply housing 122. The controller 112 further comprises a power switch 1125 which is electrically connected to the rechargeable battery for controlling the working state of the rechargeable battery, so as to control the one and off state of the light emitting member 111. In the example shown in the figure, the power switch 1125 is located at the end of the power supply housing 122 and is implemented as a pressing key.

In addition, the connecting circuit 1122 is extended along an outside of the reflector 14 to a position connected to the circuit board 1121, so as not to pass through the reflecting cavity 141 of the reflector 14, so as not to block the light from the light emitting member 111.

It can be understood that, in this embodiment, the control switch 1124 of the illumination adjusting element 20 can be implemented as a pressing key, so that the illumination adjusting element 20 can be switched between power-on and power-off states, so as to cooperate with the condensing lens 13 to realize different illumination patterns such as condensing spot light pattern and diffusely scattering pattern.

More specifically, when the user presses the power switch 1125 to activate the light emitting member 111 to emit light, for the low gloss irradiation target surface, the user can operate the control switch 1124 to shift the illumination adjusting element 20 into an electrified state, the illumination adjusting element 20 is this be in a transparent mode, and the light emitted by the light emitting member 111 is condensed by the condensing lens 13 to provide a condensing illumination performance. For the high gloss irradiation target surface, the user can operate the control switch 1124 to shift the illumination adjusting element 20 into a power-off state. The emitted light will be scattered by the illumination adjusting element 20 before entering the condensing lens 13 so as to reduce the light reaching the eyes of the user.

Figure 12:
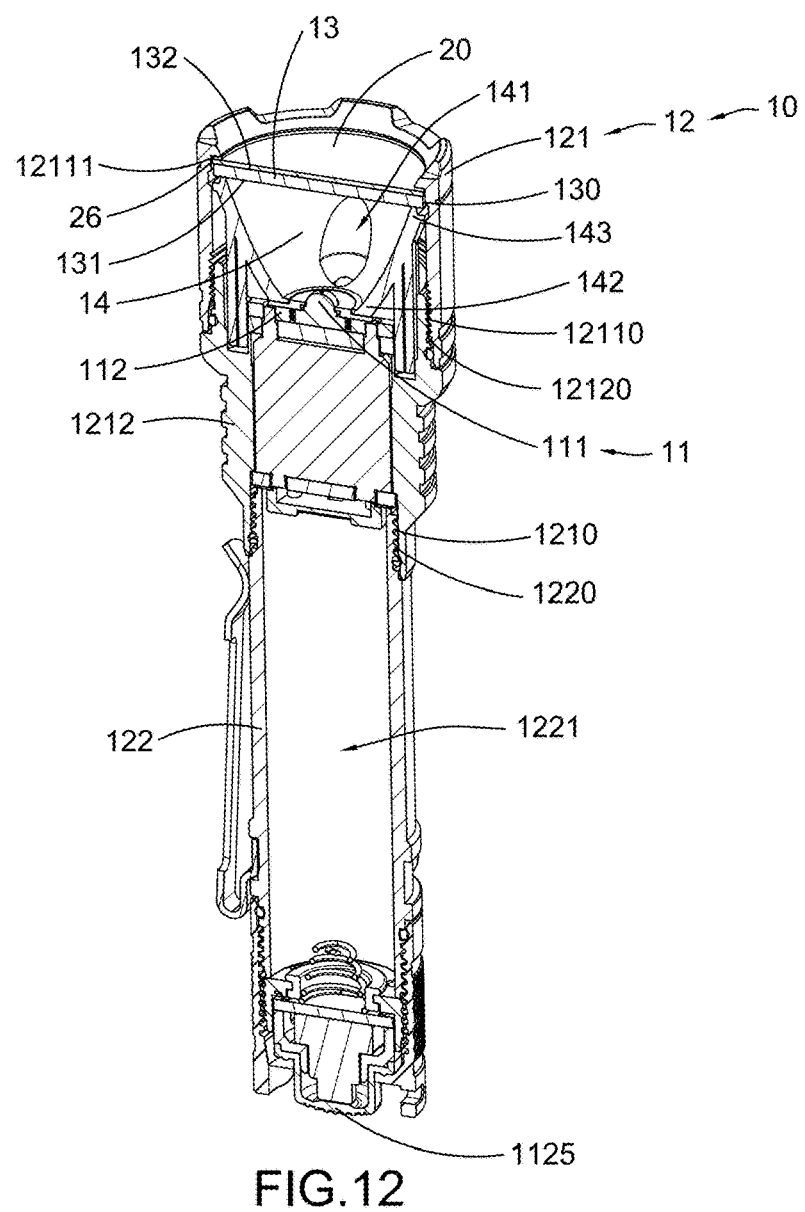
FIG. 12 is a sectional view of the flash light according to a first alternative mode of the above second preferred embodiment of the present invention.

As shown in FIG. 12, according to a first alternative mode of the second preferred embodiment of the present invention, the illumination adjusting element 20 may be disposed on the outer side 132 of the condensing lens 13, and the light from the light emitting member 111 is refracted and converged by the condensing lens 13 before entering the illumination adjusting element 20. In other words, in this embodiment, the light is being collected by the condensing lens 13 before entering the illumination adjusting element 20. By controlling the power-on and power-off states of the entering the illumination adjusting element 20, the control of the illumination pattern of the light emitted from the light fixture is achieved.

As shown in FIG. 13, according to a second alternative mode of the second preferred embodiment of the present invention, the control switch 1124 of the illumination adjusting element 20 is implemented as a knob, and when the knob is turned, the voltage on the ITO film may gradually increase from zero to the maximum, and accordingly, the electric current through the illumination adjusting element 20 may gradually increase from zero to the maximum. When the electric current through the illumination adjusting element is zero, that is, the illumination adjusting element 20 is in the power-off state, at this time, the illumination adjusting element 20 is in a haze and opaque mode, and its transparency is minimal. When the electric current flowing through the illumination adjusting element 20 increases to the maximum value, that is, the illumination adjusting element 20 is in a power-on state and the illumination adjusting element 20 is in the transparent mode. And when the electric current flowing through the illumination adjusting element 20 gradually increases from zero, the transparency of the illumination adjusting element 20 gradually increases, so that the transparency of the illumination adjusting element 20 can be adjusted steplessly. That is, in this embodiment, the illumination adjusting effect of the illumination adjusting element 20 can be continuously adjusted by rotating the control switch 1124, so as to meet the illumination requirements in different application scenarios.

The mechanical structure of the conventional flashlight needs to be fixed at the condensing position and the scattering position, so that only two different illumination patterns can be provided. However, the illumination adjusting element 20 of the present invention is electrically controlled by adjusting the voltage and electric current thereof, thereby allowing the lighting fixture to provide a variety of different illumination patterns.

As shown in FIG. 14, according to a third alternative mode of the second preferred embodiment of the present invention, the illumination adjusting element 20 is disposed on the lamp cover 1211 so as to serve as a lampshade of the lighting fixture. The condensing lens 13 can be assembled to the outlet end 143 of the reflector 14.

Figure 15:
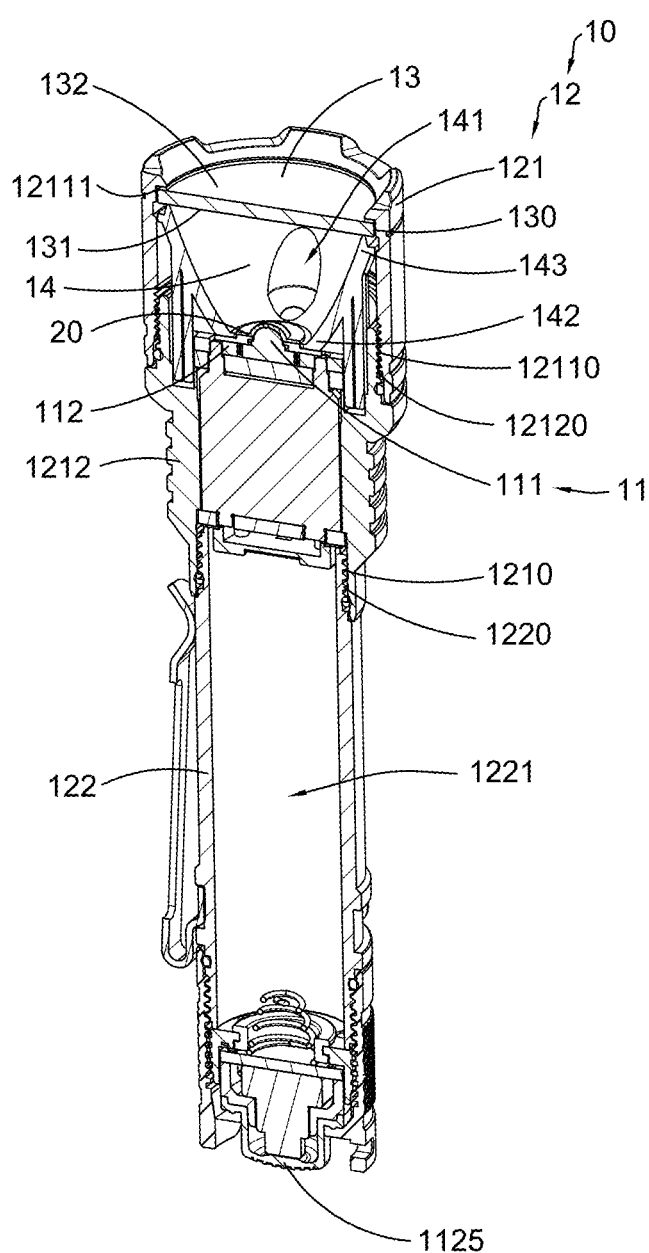
FIG. 15 is a sectional view of the flash light according to a fourth alternative mode of the above second preferred embodiment of the present invention.

As shown in FIG. 15, according to a fourth alternative mode of the second preferred embodiment of the present invention, the illumination adjusting element 20 is disposed on the light emitting member 111, and can be attached to a surface of the light emitting member 111.

Figure 16:
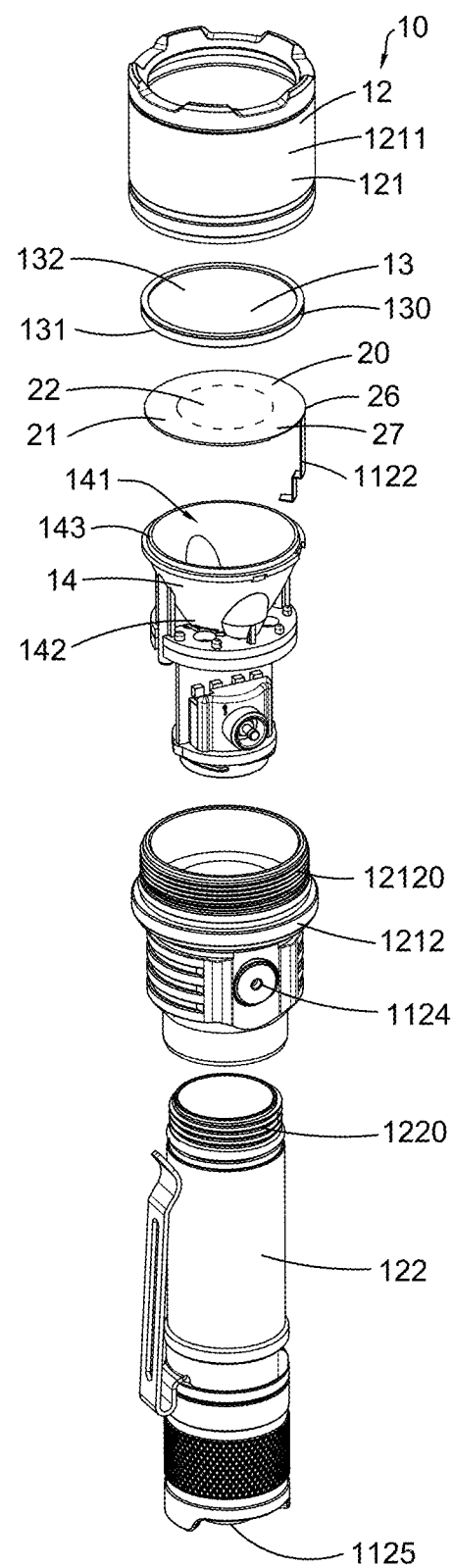
FIG. 16 is an exploded view of the flash light according to a fifth alternative mode of the above second preferred embodiment of the present invention.

As shown in FIG. 16, according to a fifth alternative mode of the second preferred embodiment of the present invention, the illumination adjusting element 20 comprises two layers of ITO films 21 and a liquid crystal layer 22 sandwiched between the ITO films 21, wherein the liquid crystal layer 22 is only located in a partial area such as the middle area of the illumination adjusting element 20, and an annular area 27 of the illumination adjusting element 20 is not provided with the liquid crystal layer 22, and thus is transparent.

In other words, in this embodiment of the present invention, a partial area of the illumination adjusting element 20 has the illumination adjusting effect. More specifically, for example, the middle area of the illumination adjusting element 20 can be switched between the transparent mode and the haze and opaque mode, so that when the illumination adjusting element 20 is in an electrified state, the light emitted from the light emitting member 111 can penetrate the illumination adjusting element 20 and the condensing lens 13 to provide concentrated light. When the illumination adjusting element 20 is in the power-off state, a part of the light emitted from the light emitting member 111 directly passes through the condensing lens 13 to form a brighter annular spot, and at least a part of light will reach the illumination adjusting element 20 at a position corresponding to area of the liquid crystal layer 22 in the middle of illumination adjusting element 20, so that this part of light is diffusely scattered, so that the lighting fixture provides less light at the position corresponding to the middle area of the illumination adjusting element 20.

As shown in FIG. 17 to FIG. 21, an illumination adjusting assembly 30 and an illumination arrangement 1000 according to a third preferred embodiment of the present invention is illustrated. The illumination adjusting assembly 30 can be installed with a lighting fixture 40 to form the illumination arrangement 1000, in this embodiment, the lighting fixture is a lighting body embodied as a flashlight, the illumination adjusting assembly 30 comprises a illumination adjusting element 31 and a mounting element 32, the mounting element 32 is used to install the illumination adjusting assembly 30 on the lighting fixture 40, the illumination adjusting element 31 is connected with the mounting element 32 to form a cover, and the illumination adjusting element 31 Switching between the fog mode and the transparent mode by means of electrical control enables the lighting device to provide different illumination light types.

More specifically, the lighting fixture 40 comprises a light source 41, a housing 42 and a condensing lens 43, wherein the light source 41 and the condensing lens 43 are assembled in the housing 42, and the light source 41 emits light which is condensed by the condensing lens 43 and then projected out to provide lighting effects. In this embodiment, the lighting fixture 40 further comprises a reflector 44, which is bowl-shaped and can be tapered in cross section, the reflector 44 has a reflecting cavity 441, and has a mounting end 442 and an outlet end 443, the mounting end 442 of the reflector 44 is assembled with the light source 41, and the condensing lens 43 is assembled at the outlet end 443 of the reflector 44, so that part of the light generated by the light source 41 is projected toward the condensing lens 43, so as to be condensed, another part of the light reaches the reflector 44 and is reflected and then projected to the condensing lens 43 to be condensed and then exit the lighting fixture 40.

The light source 41 comprises at least one light emitting member 411 and a controller 412, and the light emitting member 411 is electrically connected to the controller 412. The mounting end 442 of the reflector 44 is assembled to the controller 412, so that the light emitting member 411 of the light source 41 is located in the reflecting cavity 441, and an inner surface 444 of the reflector 44 define the reflecting cavity 441 and form a reflecting surface to reflect the light from the light emitting member 411. The condensing lens 43 may be a lens such as a convex lens capable of converging the light emitted by the light emitting member 411. In a specific example, the condensing lens 43 may be a Fresnel lens. The light emitting member 411 can be implemented as various light emitting components such as fluorescent lighting member, LED, OLED, etc.

The housing 42 comprises a lamp housing 421 and a power supply housing 422, and the lamp housing 421 is used to assemble the light source 41, the condensing lens 43 and the reflector 44. The power supply housing 422 is used to assemble a power supply module. Correspondingly, the battery housing 422 has a power supply cavity 4221 for accommodating a power supply module. The power supply module may be a rechargeable battery or an AC/DC conversion module, so as to convert the AC power into a power supply that can be used by the lighting fixture.

Figures 17, 18:
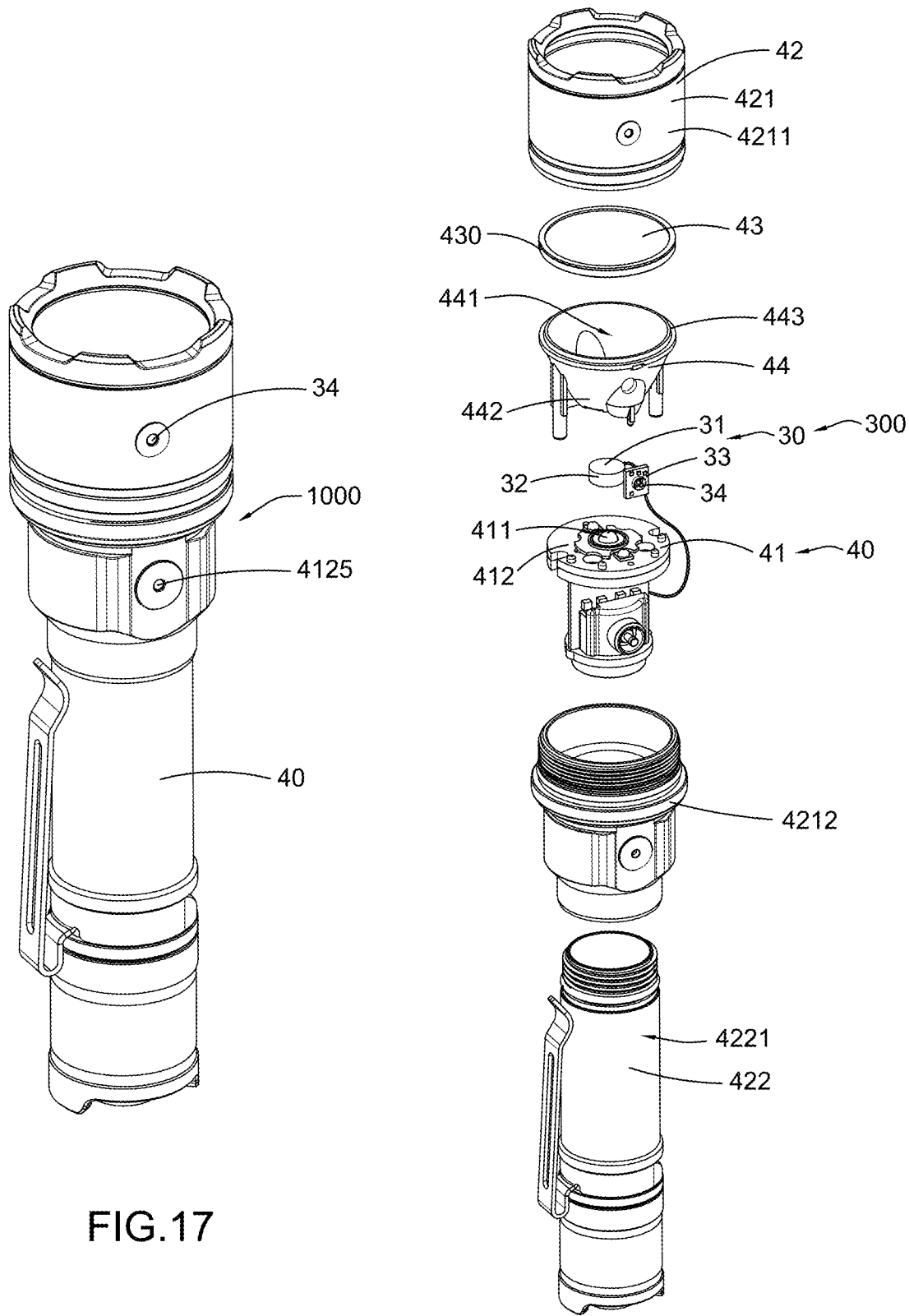
FIG. 17 is a perspective view of an illumination arrangement according to a third preferred embodiment of the present invention.
FIG. 18 is an exploded view of the illumination arrangement according to the above third preferred embodiment of the present invention, illustrating an lighting fixture is incorporated with an illumination adjusting assembly.
Figure 19:
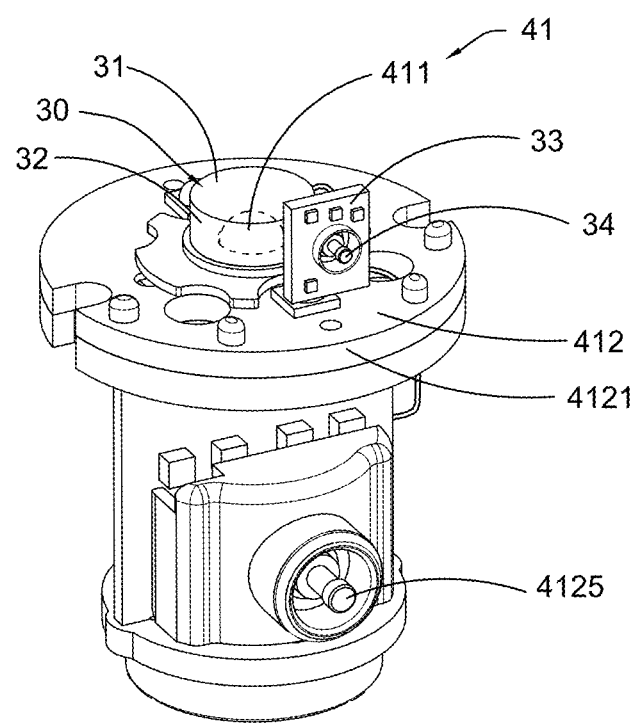
FIG. 19 is a schematic view illustrating a lighting source being assembled with the illumination adjusting assembly of the illumination arrangement according to the above third preferred embodiment of the present invention.
Figure 20:
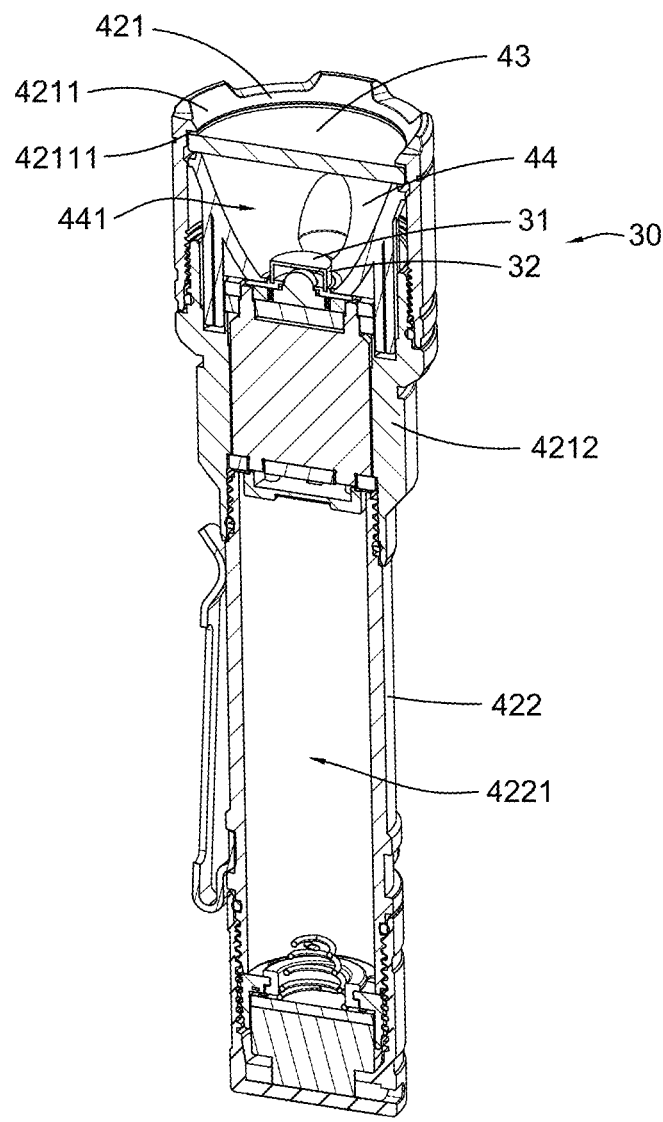
FIG. 20 is a sectional view of the illumination arrangement according to the above third preferred embodiment of the present invention.

The housing 42 can be an integral housing, or as shown in FIG. 18, the lamp housing 421 and the power supply housing 422 are two independent housings, and the two components can be detachably assembled together. For example, the lamp housing 421 and the power supply housing 422 can be assembled through the engagement between inner threads and the outer threads which are matched with each other.

In other words, the lighting fixture of the present invention may comprises two units, a light emitting unit and a power supply unit. The light emitting unit comprises the lamp housing 421, the light source 41 and the condensing lens 43 assembled in the lamp housing 421, and the reflector 44, the power supply unit comprises the power supply housing 422 and a rechargeable battery assembled in the power supply cavity 4221 of the power supply housing 422. The two units can be assembled independently of each other and then assembled with each other later. In this way, one light emitting unit can be matched with different power supply units, and one power supply unit can also be matched with different light-emitting units, so that the assembly of the lamp is relatively convenient.

In this embodiment of the present invention, the illumination adjusting assembly can be installed with the lighting fixture 40, and the mounting element 32 is mounted on the light source 41 so that the illumination adjusting element 31 is located at a front side of of the light source 41 at a position between the light emitting member 411 of the light source 41 and the condensing lens 43, so as to adjust the illumination pattern of light light emitted by the light source 41.

Correspondingly, the condensing lens 43 and the illumination adjusting assembly form an illumination adjusting mechanism 300 in this embodiment of the present invention, and can cooperate with each other to condense and diffuse the light emitted by the light emitting member 411. More specifically, the condensing lens 43 plays the role of concentrating light, and the illumination adjusting element 31 is a component that can be electrically controlled, which can be switched between the power-on state and the power-off state, so as to be shifted between a transparent mode and a haze and opaque mode, so that when the illumination adjusting element 31 is in the transparent mode, the light emitted by the light emitting member 411 passes through the transparent illumination adjusting element 31 and is condensed by the condensing lens 43, so that the illumination arrangement 1000 can be in a condensing mode to provide a converging illumination spot. When the illumination adjusting element 31 is in the haze and opaque mode, the light emitted by the light emitting member 411 will be diffused scattered when passing through the haze and opaque illumination adjusting element 31 before passing through the condensing lens 43. Thus, the illumination arrangement 1000 can be in a diffusing mode to provide diffused illumination light.

Correspondingly, the illumination arrangement 1000 of the present invention can provide different lighting effects according to the needs of application scenarios. For example, when the irradiated target surface is a low-gloss surface, the illumination adjusting element 31 can be energized to be in a transparent mode so that the light emitted by the light emitting member 411 is condensed by the condensing lens 43, thereby allowing more reflected Light to reach the human eye. When the surface of the irradiated target is a high gloss surface, the illumination adjusting element 31 can be powered off to be in a haze and opaque mode, so that the light emitted by the light emitting member 411 is scattered by the illumination adjusting element 31 before reaching to the condensing lens 43, and thus only a small amount of reflected light can reach the human eye, so that the lighting fixture can cope with the lighting conditions on the surface of the object with different gloss levels.

Figure 21:
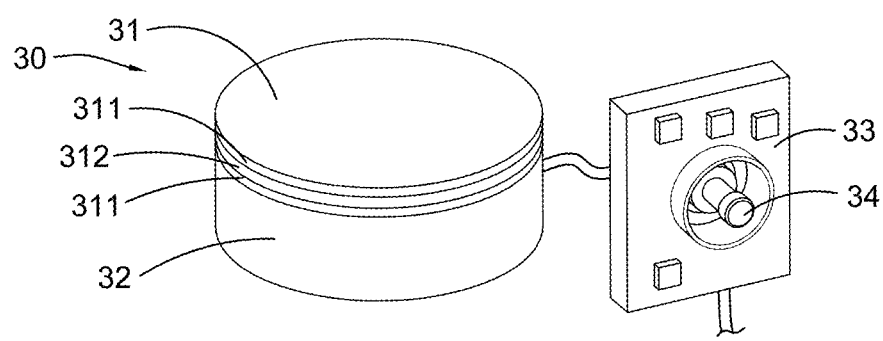
FIG. 21 is a partially enlarged view of the illumination adjusting assembly of the illumination arrangement according to the above third preferred embodiment of the present invention.

Referring to FIG. 21, the illumination adjusting element 31 comprises two transparent ITO (IndiumTinOxide, tin-doped indium oxide) films 311 and a liquid crystal layer 312 located between the two layers of ITO films 312. When a voltage is applied to the two layers of ITO films 311, that is, when the illumination adjusting element 31 is in the power-on state, the polymer liquid crystal material of the liquid crystal layer 312 is arranged in an orderly manner, so that the liquid crystal layer 312 is in a transparent state, which allows the light emitted from the light emitting member 411 to pass through without changing the projection direction. When the two layers of ITO films 311 are in a power-off state, the polymer liquid crystal materials of the liquid crystal layer 312 are arranged disorderly, so that the liquid crystal layer 312 is no longer transparent, so that the light emitted by the light emitting member 411 enters the illumination adjusting element 31 is then scattered. It can be understood that there may be other protective films on the outside of the transparent two ITO film 311, and the illumination adjusting element 31 may be further attached to a transparent glass or plastic layer to enhance its strength.

The housing 421 further comprises a lamp housing 4211 and an accommodating housing 4212 which are detachably connected, such as detachably engaged by threads. In this embodiment, the condensing lens 43 is assembled to the lamp housing 4211 which is in the shape of a lens barrel. More specifically, an inner side of the lamp housing 4211 has a stepped surface 42111, and the condensing lens 43 has an outer peripheral edge 430 abutting against the stepped surface 42111 inside the lamp housing 4211, so that the condensing lens 43 is assembled to the lamp housing 4211. It can be understood that an adhesive layer may be applied between the condensing lens 43 and the stepped surface 42111 inside the lamp housing 4211 to bond the condensing lens 43 to the stepped surface 42111 of the lamp housing 4211.

The controller 412 comprises a circuit board 4121 and a power switch 4125, and the light emitting member 411 is electrically connected to the circuit board 4121 and supported on the circuit board 4121. In this embodiment, the illumination adjusting assembly 30 further comprises a driving module 33 and a control switch 34, and the driving module 33 is electrically connected to ITO films 311 of the illumination adjusting assembly through wires, and the control switch 34 is electrically connected to the driving module 33 through wires to enable or disable the operation of the driving module 33. The controller 412 further comprises the power switch 4125 which is electrically connected to the rechargeable battery for controlling the working state of the rechargeable battery, thereby controlling the light emitting member 411 to be turned on and off In the example shown in the figures, the power switch 4125 is located at the end of the power supply housing 422 and is implemented as a key.

The driving module 33 may be further adapted to be electrically connected to the circuit board 4121 or the rechargeable battery in the power supply cavity 4221 of the power supply housing 422 with wires or electrical connection contacts, so that the driving module 33 can be powered by the rechargeable battery in the power supply cavity 4221 of the power supply housing 422.

The mounting element 32 of the illumination adjusting assembly 30 is suitable for being assembled on the circuit board 4121, for example, being bonded to the circuit board 4121. It can be understood that the mounting element 32 is made of a transparent material, so as not to block the light emitted by the light emitting member 411. The mounting element 32 and the illumination adjusting element 31 are integrally formed, or the mounting element 32 and the illumination adjusting element 31 are assembled such that the illumination adjusting element 31 is adhered to the mounting element 32.

In this embodiment, the mounting element 32 is implemented in a cylindrical shape and is adapted to surround the light emitting member 411, so that most of the light emitted by the light emitting element 411 passes through the illumination adjusting element 31 first, and then the light projects to the inner surface of the reflector 414 and the condensing lens 43.

In addition, in this embodiment, the driving module 33 is located on the top side of the circuit board 4121 at a lateral side of the light emitting member 411 so as not to block the light emitted by the light emitting member 411. It can be understood that, in this embodiment, wires of the control switch 34 of the illumination adjusting element 31 are adapted to pass through the reflector 414 and the housing 42 of the lighting fixture 40, and can be implemented as a key, so as to be operated by the user to switch the illumination adjusting element 31 between power-on and power-off states, so as to cooperate with the condensing lens 43 to provide different illumination patterns such as condensing spot pattern or diffusely scattering pattern.

More specifically, when the user presses the power switch 4125 to activate the light emitting member 411 to emit light, the user can operate the control switch 34 to switch the illumination adjusting element 31 into the power-on state, so that the illumination adjusting element 31 is in a transparent mode, and the light emitted by the light emitting member 411 is condensed by the condensing lens 43 to provide a condensing illumination effect for the low-gloss irradiation target surface. For the high-gloss irradiation target surface, the user can operate the control switch 34 switch the illumination adjusting element 31 into the power-off state. The light emitted by the light emitting member 411 will be diffusely scattered by the illumination adjusting element 31 of before entering the condensing lens 43 so as to reduce the light reaching the eyes of the user.

It is worth mentioning that, in the present invention, the illumination adjusting assembly 30 itself is configured with the driving module 33, and under the control of the control switch 34 for electrically conduction and disconnection, so that it can work independently without being controlled by the lighting fixture 40.

Figure 22:
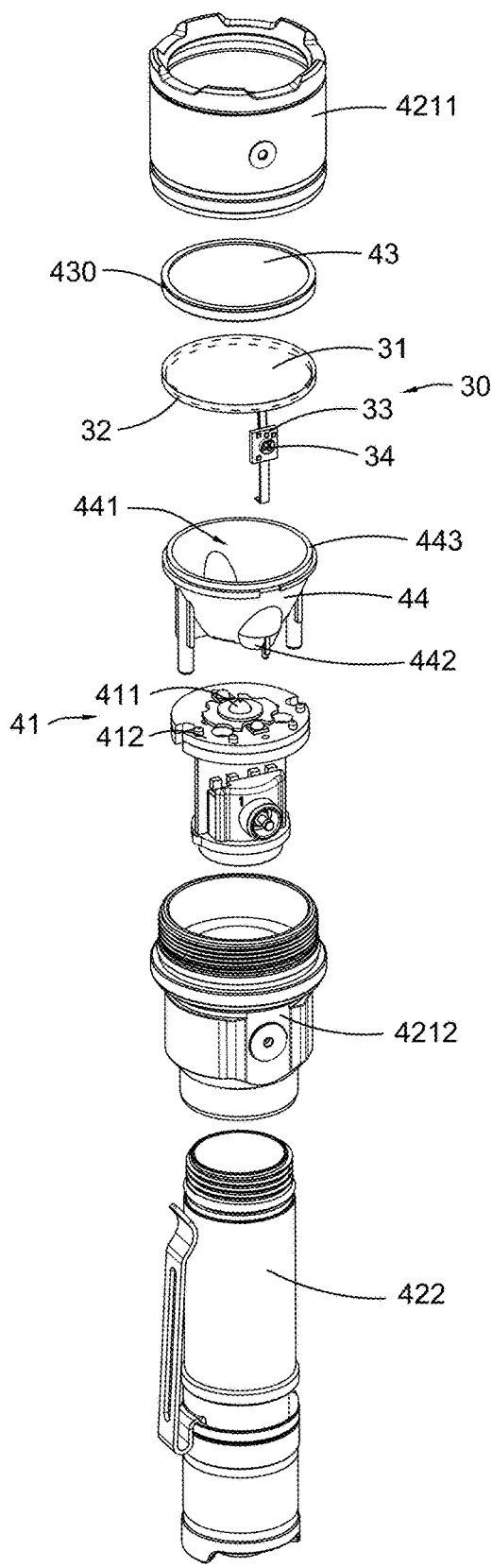
FIG. 22 is an exploded view of the illumination arrangement according to a first alternative mode of the above third preferred embodiment of the present invention.

As shown in FIG. 22, according to a first alternative mode of the above mentioned third preferred embodiment of the present invention, the illumination adjusting assembly is implemented as a lampshade comprises an illumination adjusting element 31, a mounting element 32, a driving module 33 and a control switch 34, the driving module 33 is electrically connected to the illumination adjusting element 31 and the control switch 34, the mounting element 32 is implemented as a housing in this embodiment, so the illumination adjusting element 31 is assembled on an open end of the mounting element 32. The control switch 34 may be disposed on the mounting element 32 and protrude from the outer surface of the mounting element 32.

Similarly, the lighting fixture 40 comprises a light source 41, a housing 42, a condensing lens 43 and a reflector 44. The light source 41 comprises at least one light emitting member 411, the condensing lens 43 is used to condense the light from the light emitting member 411, and the reflector 44 is used to reflect and direct the light from the light emitting member 411 to the condensing lens 43, and the condensing lens 43 is assembled to an outlet end 443 of the reflector 44.

The illumination adjusting assembly 30 is provided on the outside of the reflector 44 and the condensing lens 43 in this embodiment, and the driving module 33 is located between the mounting element 32 and the reflector 44, so that there is no blocking object in a light reflecting cavity 441 of the reflector 44 to block the light emitted by the light emitting member 411.

In this embodiment, the condensing lens 43 is located between the light emitting member 411 of the light source 41 and the illumination adjusting element 31 of the illumination adjusting assembly 30, so that the light emitted by the light emitting member 411 is reflected by the reflector 44 and condensed by the condensing lens 43 before reaching the illumination adjusting element 31, so that the light will finally be proceed by the illumination adjusting element 31.

Figure 23:
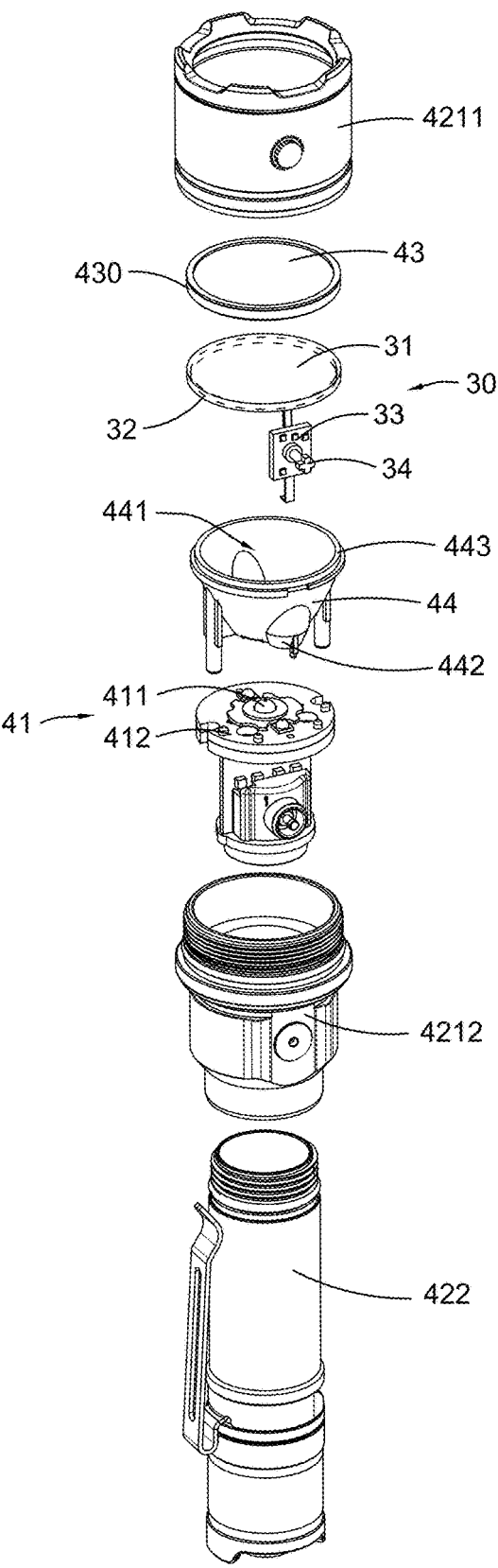
FIG. 23 is an exploded view of the illumination arrangement according to a second alternative mode of the above third preferred embodiment of the present invention.

As shown in FIG. 23, according to a second alternative mode of the above mentioned third preferred embodiment of the present invention, the control switch 34 for controlling the illumination adjusting element 31 is implemented as a knob, and when the knob is turned, the voltage applied to the ITO films 311 can gradually increase from zero to the maximum, and correspondingly, the electric current through the illumination adjusting element 31 can gradually increase from zero to the maximum. When the electric current passing through the illumination adjusting element 31 is zero, that is, the illumination adjusting element 31 is in a power-off state, at this time, the illumination adjusting element 31 is in a haze and opaque mode, and its transparency is minimal. When the electrical current flowing through the illumination adjusting element 31 increases to a maximum value, that is, the illumination adjusting element 31 is in the power-on state and the illumination adjusting element 31 is in the transparent mode. And in the process that the electrical current flowing through the illumination adjusting element 31 gradually increases from zero, the transparency of the illumination adjusting element 31 gradually increases, so that the transparency of the illumination adjusting element 31 can be adjusted steplessly. In other words, in this embodiment, the illumination adjusting performance of the illumination adjusting element 31 can be continuously adjusted by rotating the control switch 34, so as to meet the lighting requirements in different application scenarios.

The mechanical structure of the conventional flashlight needs to be fixed at the condensing position and the scattering position after moving its light source or condensing lens element, so that only two different illumination patterns can be provided. However, the illumination adjusting element 31 of the present invention is electrically controlled, thereby allowing the illumination arrangement 1000 to provide multiple different illumination patterns.

Figure 24:
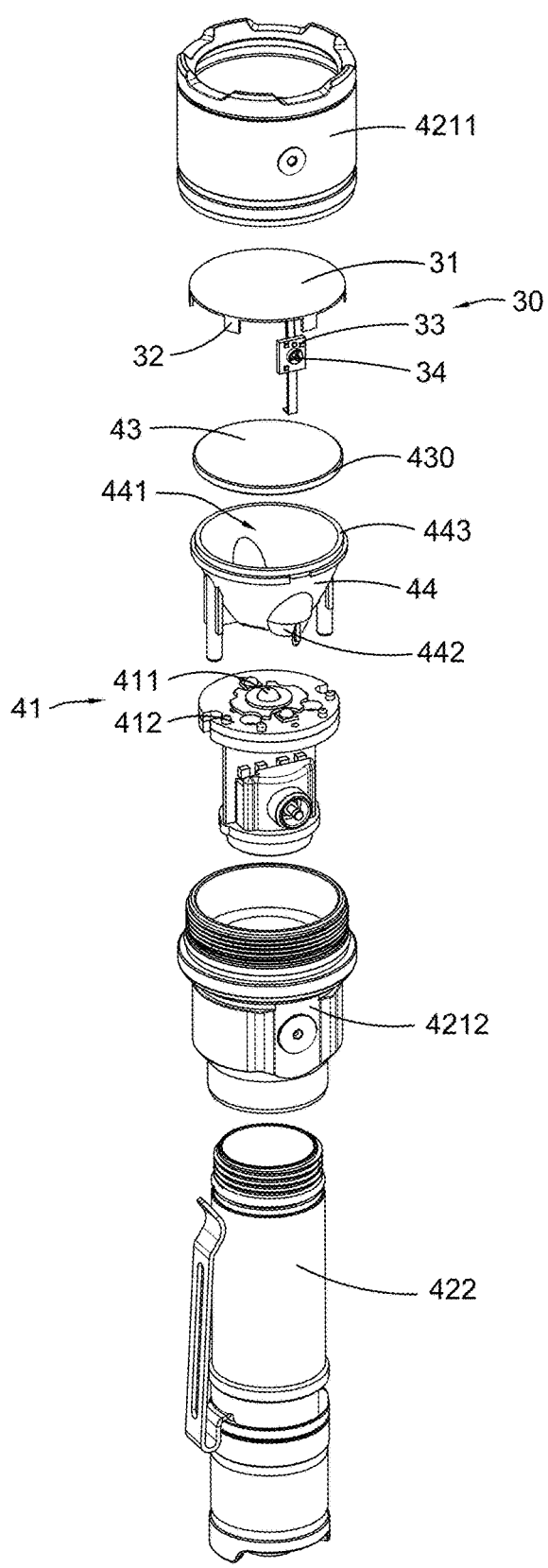
FIG. 24 is an exploded view of the illumination arrangement according to a third alternative mode of the above third preferred embodiment of the present invention.

As shown in FIG. 24, according to a third alternative mode of the above mentioned third preferred embodiment of the present invention, the lighting fixture 40 comprises a light source 41, a housing 42, a condensing lens 43 and a reflector 44. The light source 41 includes at least one light emitting member 411, the condensing lens 43 is used to condense the light from the light emitting member 411, and the reflector 44 is used to reflect and direct the light from the light emitting member 411 to the condensing lens 43, and the condensing lens 43 is assembled to an outlet end 443 of the reflector 44.

The housing 42 comprises a lamp housing 4211, and the reflector 44 is arranged in the lamp housing 4211. The illumination adjusting assembly 30 is located at an outer side of the reflector 44 wile at an inner side of the lamp housing 4211 in this embodiment, and the driving module 33 is located between the mounting element 32 and the reflector 44, or between the mounting element and the lamp housing 421, so that there is no object in the light reflecting cavity 441 of the reflector 44 to block the light emitted by the light emitting member 411.

In this embodiment, the illumination adjusting element 31 is located between the condensing lens 43 and the reflector 44, so that part of the light emitted by the light emitting member 411 is directly projected to the illumination adjusting element 31, and part of the light is reflected by the light reflector 44 first and then reaches the light-adjusting film 31 for adjusting its projecting light effect, and then reaches the condensing lens 43 for being condensed.

It can be understood that, the mounting element 312 is mounted on to circuit board 4121 of the light source 41. If the mounting element 312 is adhered to the circuit board 4121 of the light source 41, the mounting element 312 can be implemented as a bracket.

Figure 25:
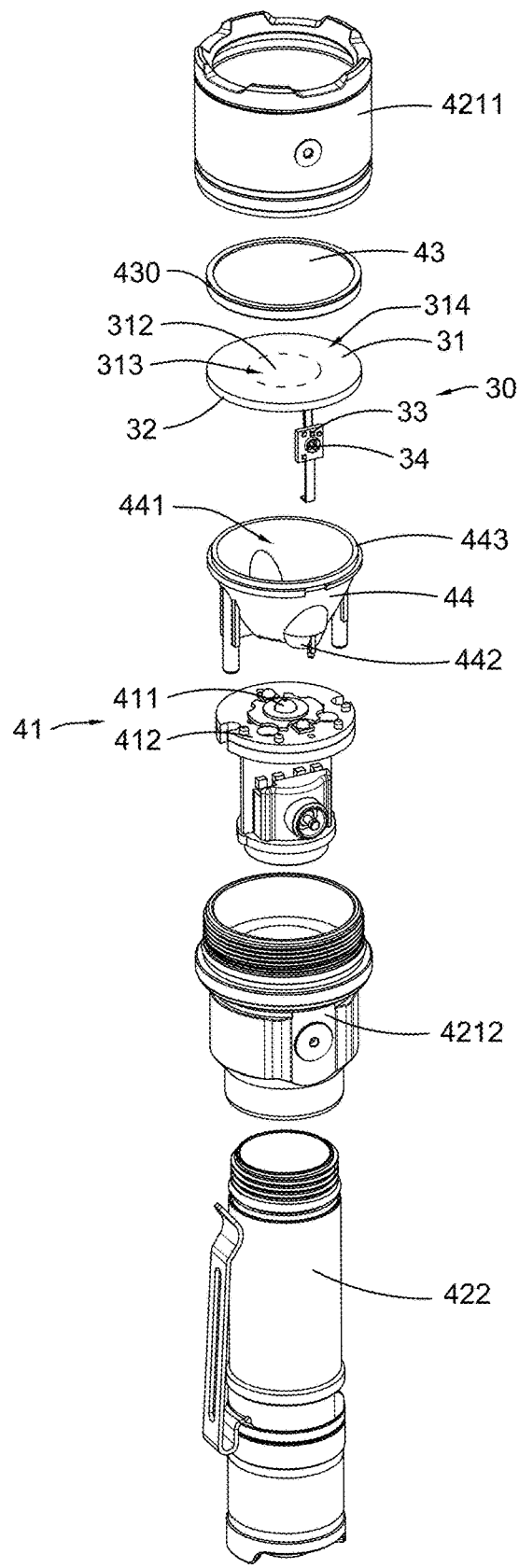
FIG. 25 is an exploded view of the illumination arrangement according to a fourth alternative mode of the above third preferred embodiment of the present invention.

As shown in FIG. 25, according to a fourth alternative mode of the above mentioned third preferred embodiment of the present invention, the light illumination element 31 comprises two layers of ITO films 311 and a liquid crystal layer 312 sandwiched between the ITO films 311, wherein the liquid crystal layer 312 is only located in the middle area 313 of the illumination adjusting element 31, and the annular area 314 of the illumination adjusting element 31 is not provided with the liquid crystal layer 312, and thus is transparent.

In other words, in this embodiment of the present invention, a partial area of the illumination adjusting element 31 has the illumination adjusting effect. More specifically, for example, the circular area in the middle of the illumination adjusting element 31 can be switched between the transparent mode and the haze and opaque mode, so that when the illumination adjusting element 31 is in an electrified state, the light emitted by the light emitting member 411 can pass through the transparent illumination adjusting element 31 and then is condensed by the condensing lens 43 to provide concentrated light. When the illumination adjusting element 31 is powered off, a part of the light emitted from the light emitting member 411 directly passes through the condensing lens 43 to form a brighter annular spot, and at least a part of the light will reach the illumination adjusting element 31 corresponding to the liquid crystal layer 312 in the middle of illumination adjusting element 31, so that this part of light is scattered so that the illumination arrangement 1000 provides less light at the position corresponding to the middle area of the illumination adjusting element 31.

Figure 26:
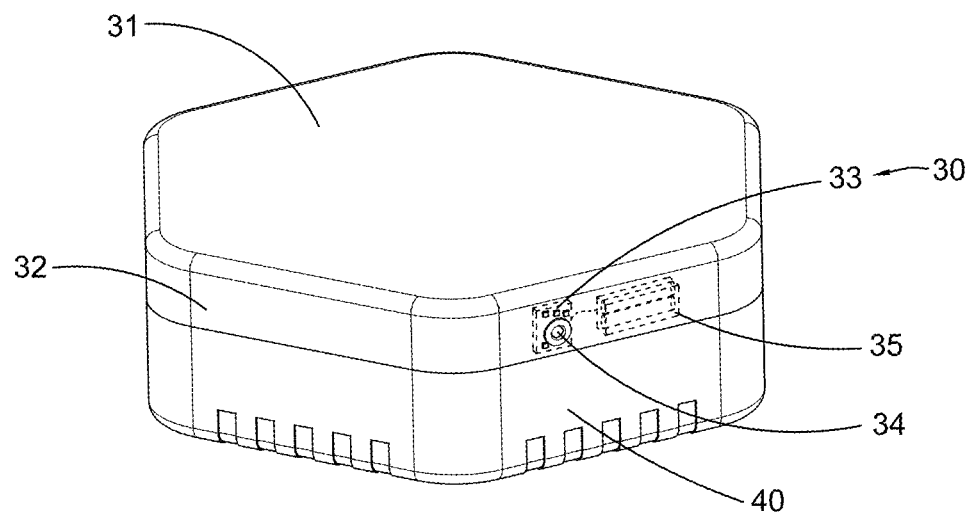
FIG. 26 is a perspective view of an illumination arrangement and an illumination adjusting assembly according to a fourth preferred embodiment of the present invention.
Figure 27:
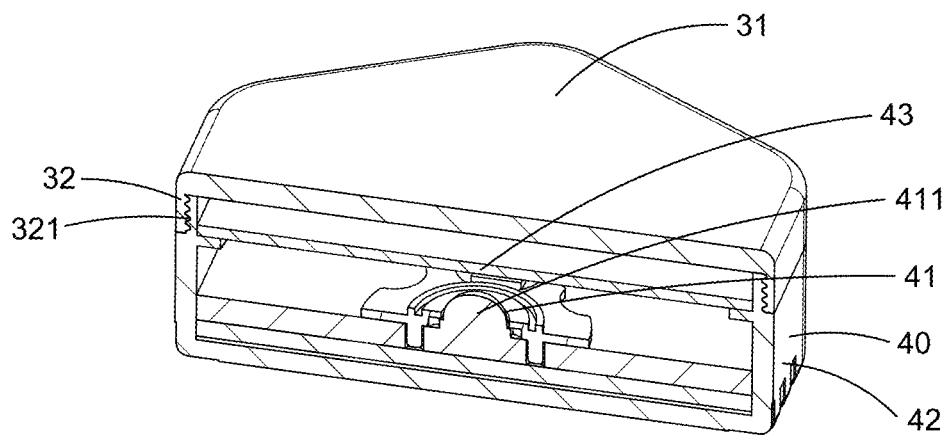
FIG. 27 is a sectional view of the illumination arrangement according to the above fourth preferred embodiment of the present invention, illustrating the illumination adjusting assembly being assembled on a lighting fixture.

As shown in FIGS. 26 and 27, an illumination adjusting assembly 30 according to a fourth preferred embodiment of the present invention is applied to a lighting fixture 40 to form an illumination arrangement 1000. In this embodiment, the illumination adjusting assembly 30 is implemented as a lampshade comprising an illumination adjusting element 31, a mounting element 32, a driving module 33, a control switch 34 and a power supply module 35, the illumination adjusting assembly 30 can be used as an independent component, and is adapted to be mounted on the lighting fixture 40 as an add-on structure without changing the original structure of the lighting fixture 40 as much as possible.

In this embodiment, the illumination adjusting element 31, the driving module 33 and the control switch 34 are electrically connected to each other, and the three are powered by the power supply module 35. The power supply module 35 is accommodated in the cavity formed by the mounting element 32, and can be a rechargeable battery or an AC-DC conversion module to convert the AC power into a DC power source that can be used by the illumination adjusting element 31.

In other words, the illumination adjusting assembly 30 can be operated and used independently, and is powered by the power supply module 35 alone, so that it can be easily matched with the lighting fixture 40 without specially designing the structure of the lighting fixture 40, and there is no need for the electrical connection of the illumination adjusting assembly 30 through a power supply structure by the lighting fixture 40.

It can be understood that the lighting fixture 40 may be a mobile light fixture or a fixed light fixture, and accordingly, the above mentioned condensing lens 43 may be provided, which is also used as a lens for concentrating light. Other light concentrating structures such as the reflector 44 described above may also be included. The lighting fixture 40 is an independent light emitting device, which is also configured with a light source 41 and a housing 42, and a power module such as a rechargeable battery or a voltage conversion module that can be stored in the housing 42 for supplying power to the lighting fixture 40.

It can be understood that the housing 42 comprises a lamp housing 4211, and the illumination adjusting assembly 30 can be assembled to the lamp housing 4211 through the mounting element 32, so that the lighting fixture 40 is configured with a dimming function by the illumination adjusting assembly 30, so that the illumination arrangement 1000 composed of the illumination adjusting assembly 30 and the lighting fixture 40 has an adjustable lighting effect. For example, the mounting element 32 of the illumination adjusting assembly 30 can be assembled to the lamp housing 4211 through a matching screw structure 321.

In other words, the illumination adjusting assembly 30 is added on the lighting fixture 40, so that the light generated by the lighting fixture 40 can be regulated and adjusted by the illumination adjusting element 31 of the illumination adjusting assembly by means of electrical control. Specifically, when the illumination adjusting element 31 is energized to be in the transparent mode, the light generated by the lighting fixture 40 is allowed to pass through the illumination adjusting element 31, thereby providing high intensity illumination, so that more light reflected by a surface of an illuminated object can reach the human eyes. When the illumination adjusting element 31 is powered off to be in the haze and opaque mode, the light generated by the lighting fixture 40 is scattered by the illumination adjusting element 31, so that less reflected light reaches the human eyes.

Figure 28:
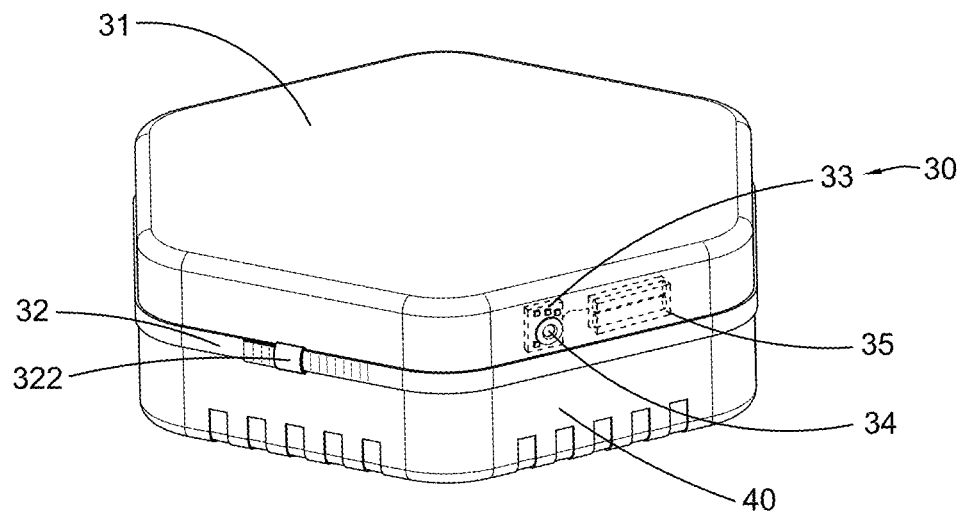
FIG. 28 is a schematic view illustrating the illumination adjusting assembly being assembled on the lighting fixture of the illumination arrangement according to a first alternative mode of the above fourth preferred embodiment of the present invention.

As shown in FIG. 28, an illumination adjusting assembly 30 according to an alternative mode of the above mentioned fourth preferred embodiment of the present invention is illustrated to be applied to a lighting fixture 40 to form an illumination arrangement 1000. In this embodiment, the mounting element 32 comprises a resilient mounting ring 322 for mounting on a lamp housing of the lighting fixture 40.

Figure 29:
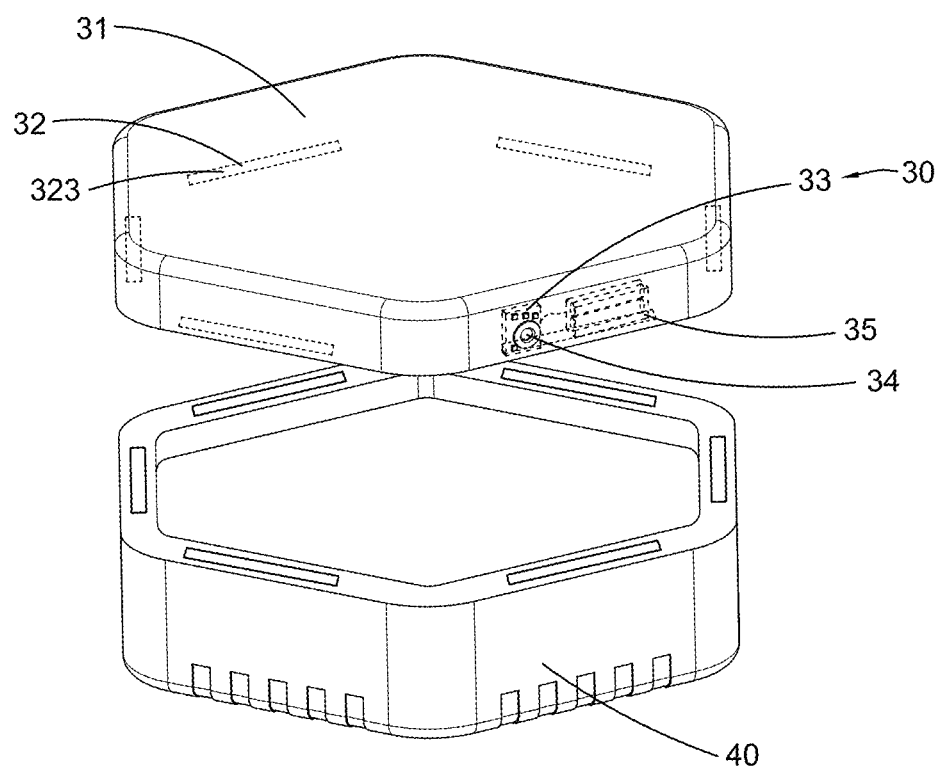
FIG. 29 is a schematic view illustrating the illumination adjusting assembly being assembled on the lighting fixture of the illumination arrangement according to a second alternative mode of the above fourth preferred embodiment of the present invention.

As shown in FIG. 29, an illumination adjusting assembly 30 according to another alternative mode of the above fourth preferred embodiment of the present invention is illustrated to be applied to a lighting fixture 40 to form an illumination arrangement 1000. In this embodiment, the mounting element 32 comprises one or more magnetic attracting elements 323. When a magnetic attractive material is provided on the housing 42 of the lighting fixture 40, the illumination adjusting assembly 30 is attached on the housing 42 of the lighting fixture 40 through the magnetic attracting element 323.

Figure 30:
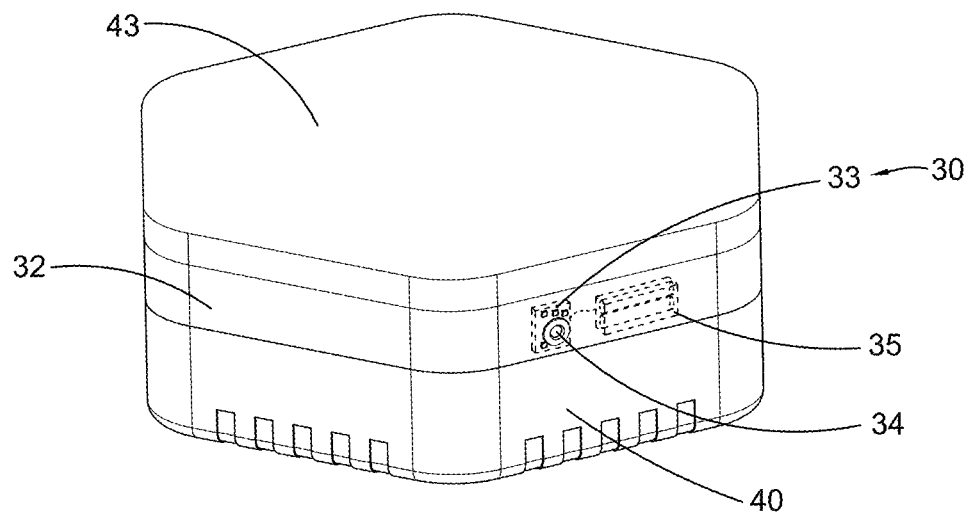
FIG. 30 is a schematic view illustrating the illumination adjusting assembly being assembled on the lighting fixture of the illumination arrangement according to a third alternative mode of the above fourth preferred embodiment of the present invention.

As shown in FIG. 30, an illumination adjusting assembly 30 according to another alternative mode of the above fourth preferred embodiment of the present invention is illustrated to be applied to a lighting fixture 40 to form an illumination arrangement 1000. In this embodiment, the illumination adjusting assembly 30 is configured with the above mentioned condensing lens 43. In other words, the illumination adjusting assembly 30 is an independent optical component that can provide two illumination effects. More specifically, it can provide a condensing effect by the condensing lens, and can also provide the diffusely scattering effect through the illumination adjusting element 31, so that the condensing lens 43 and the illumination adjusting element 31 together can provide the illumination arrangement 1000 with a condensed illumination pattern and a scattered illumination pattern, so that the independent illumination adjusting assembly 30 can satisfy the switching between the condensing illumination type and the diffusing illumination type of the illumination arrangement 1000, which reduces the structural requirements of the original lighting fixture 40 and also facilitates assembly.

Figure 31:
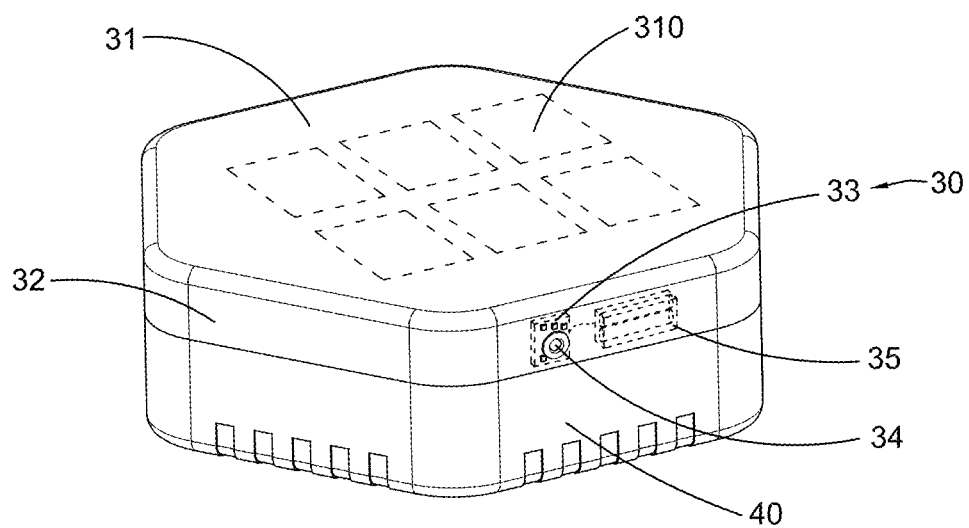
FIG. 31 is a schematic view illustrating the illumination adjusting assembly being assembled on the lighting fixture of the illumination arrangement according to a fourth alternative mode of the above fourth preferred embodiment of the present invention.

As shown in FIG. 31, an illumination adjusting assembly 30 according to another alternative mode of the above fourth preferred embodiment of the present invention is illustrated to be applied to a lighting fixture 40 to form an illumination arrangement 1000. In this embodiment, an illumination adjusting element 31 of the illumination adjusting assembly 30 is arranged with a plurality of regions 310 on the illumination adjusting element 31, wherein these regions 310 are controlled by the driving module 33, they can be powered on or off at the same time, or they can be powered on or off individually. In addition, the regions 310 can also be powered on alternately or in a predetermined order in order to realize different illumination patterns in different regions or cooperates with different light emitting members of the lighting fixture to provide varying illumination illumination patterns. Alternatively, a plurality of the illumination adjusting assembles 30 can be provided for matching with different light emitting members of the lighting fixture for providing different illumination patterns.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A lighting fixture, comprising:
    a lighting body which comprises a light source, wherein said light source comprises a controller and a light emitting member which is electrically connected to said controller;
    a condensing lens for condensing light emitted from said light emitting member; and
    an illumination adjusting element which is capable of being switched between a transparent mode and an opaque mode through electrical control, so as to allow the light from said light emitting member to pass through said condensing lens and said illumination adjusting element to provide a condensing illumination pattern when said illumination adjusting element is in said transparent mode, and to allow the light from said light emitting member to pass through said condensing lens and said illumination adjusting element to provide a diffusely scattering pattern when said illumination adjusting element is in said opaque mode, wherein said lighting fixture is able to provide different illumination patterns without requiring relative movement between said light emitting member and said condensing lens.

2. The lighting fixture according to claim 1, wherein said illumination adjusting element is attached on an inner side of said condensing lens.

3. The lighting fixture according to claim 1, wherein said illumination adjusting element is attached on an outer side of said condensing lens.

4. The lighting fixture according to claim 1, wherein said illumination adjusting element is provided on said light emitting member.

5. The lighting fixture according to claim 1, wherein said lighting body comprises a housing for mounting said light source, wherein said illumination adjusting element is mounted on said housing.

6. The lighting fixture according to claim 1, further comprising a reflector defining a reflecting cavity, wherein said light emitting member is provided in said reflecting cavity, wherein said illumination adjusting element is mounted on said reflector and sandwiched between said reflector and said condensing lens.

7. The lighting fixture according to claim 6, wherein said lighting body comprises a housing which comprises a lamp housing having a stepped surface at an inner side thereof, wherein said condensing lens is mounted to said stepped surface of said lamp housing, wherein a peripheral edge of said illumination adjusting element is sandwiched between an outer peripheral edge of said condensing lens and an outlet end of said reflector.

8. The lighting fixture according to claim 7, further comprising a connection circuit which electrically connects said illumination adjusting element to said controller of said light source, wherein said connection circuit is extended at an outer side of said reflector.

9. The lighting fixture according to claim 7, wherein said illumination adjusting element comprises two tin-doped indium oxide films and a liquid crystal layer between said two in-doped indium oxide films, wherein said two tin-doped indium oxide films are powered on to switch said illumination adjusting element into said transparent mode and are powered off to switch said illumination adjusting element into said opaque mode.

10. The lighting fixture according to claim 7, wherein said housing further comprises a power supply housing detachably coupled with said lamp housing, wherein said lamp housing is arranged to mount said light source, said power supply housing is arranged to receive a power supply module.

11. The lighting fixture according to claim 1, wherein said illumination adjusting element comprises two tin-doped indium oxide films and a liquid crystal layer between said two in-doped indium oxide films, wherein said two tin-doped indium oxide films are powered on to switch said illumination adjusting element into said transparent mode and are powered off to switch said illumination adjusting element into said opaque mode.

12. The lighting fixture according to claim 11, wherein said liquid crystal layer is provided at a partial area of said illumination adjusting element.

13. The lighting fixture according to claim 11, wherein said liquid crystal layer of said illumination adjusting element comprises a plurality of regions which are powered on individually.

14. The lighting fixture according to claim 11, further comprising a control switch electrically connected to said illumination adjusting element, wherein said control switch is a pressing key.

15. The lighting fixture according to claim 11, further comprising a control switch electrically connected to said illumination adjusting element, wherein said control switch is a rotating knob that is rotated to adjust a voltage supplied to said illumination adjusting element and to adjust an electric current flowing to said illumination adjusting element, so as to adjust transparency of said illumination adjusting element.

16. The lighting fixture according to claim 1, further comprising an illumination adjusting assembly which comprises said illumination adjusting element, a mounting element for mounting with said lighting body, a driving module electrically connected to said illumination adjusting element for activating said illumination adjusting element and a control switch for controlling operation of said driving module, wherein said driving module is independent of said controller, wherein said illumination adjusting assembly is an add-on structure on said lighting body to provide an illumination arrangement.

17. The lighting fixture according to claim 16, wherein said illumination adjusting assembly comprises a power supply module for supplying power to said driving module and said illumination said illumination adjusting element, thereby electrical control and electrical power supply of said illumination adjusting assembly is independent from electrical control and electrical power supply of said light source.

18. The lighting fixture according to claim 16, wherein said lighting body comprises a housing, wherein said mounting element is detachably mounted on said housing via one of screw structure, elastic mounting ring and magnetically attracting member.

19. The lighting fixture according to claim 16, wherein said lighting body comprises a housing, wherein said mounting element is mounted to said housing at an inner side of said housing to mount said illumination adjusting element within said housing of said lighting body.

20. The lighting fixture according to claim 16, wherein said condensing lens is integrated with said illumination adjusting element, so as to form an illumination adjusting mechanism that is said add-on structure on said lighting body.

21. The lighting fixture according to claim 16, wherein said lighting fixture is a flashlight.

\* \* \* \* \*